US 12,145,792 B2
United States Patent
Pleasants

(10) Patent No.: US 12,145,792 B2
(45) Date of Patent: Nov. 19, 2024

(54) BIKE TRANSPORT BAG AND HEADSET PROTECTION DEVICE

(71) Applicant: Thule Sweden AB, Hillerstorp (SE)

(72) Inventor: Parke Pleasants, Louisville, CO (US)

(73) Assignee: Thule Sweden AB, Hillerstorp (SE)

(*) Notice: Subject to any disclaimer, the term of this patent is extended or adjusted under 35 U.S.C. 154(b) by 52 days.

(21) Appl. No.: 17/748,785

(22) Filed: May 19, 2022

(65) Prior Publication Data
US 2022/0371816 A1 Nov. 24, 2022

(30) Foreign Application Priority Data
May 20, 2021 (DE) .................... 10 2021 113 190.1

(51) Int. Cl.
B65D 85/68 (2006.01)
A45C 5/14 (2006.01)
A45C 7/00 (2006.01)
A45C 13/00 (2006.01)
A45C 13/10 (2006.01)
B62H 3/00 (2006.01)
B65D 21/08 (2006.01)

(52) U.S. Cl.
CPC ............ *B65D 85/68* (2013.01); *A45C 5/14* (2013.01); *A45C 7/0036* (2013.01); *A45C 13/005* (2013.01); *A45C 13/103* (2013.01); *B62H 3/00* (2013.01); *B65D 21/086* (2013.01); *B65D 2585/6862* (2013.01)

(58) Field of Classification Search
CPC .......... A45C 5/14; A45C 7/00; A45C 7/0036; A45C 13/005; A45C 13/103; B65D 21/086; B65D 85/68; B65D 2585/6862

USPC ......................................................... 206/335
See application file for complete search history.

(56) References Cited

U.S. PATENT DOCUMENTS

| 3,886,988 | A | * | 6/1975 | Garrett | ..................... B62J 19/00 206/335 |
| 4,390,088 | A | * | 6/1983 | Brenner | ................. B62K 15/00 206/335 |
| 4,792,039 | A | * | 12/1988 | Dayton | .................. B65D 85/68 206/335 |
| 7,757,734 | B2 | * | 7/2010 | Hooker | .................... B62J 19/00 206/335 |
| 8,196,740 | B2 | * | 6/2012 | Jacques | ................. A45C 11/00 206/335 |

(Continued)

Primary Examiner — Bryon P Gehman
(74) Attorney, Agent, or Firm — Sterne, Kessler, Goldstein & Fox P.L.L.C.

(57) ABSTRACT

This disclosure relates to bicycle transport bags with a cover. The bicycle transport bag is adjustable between a transport configuration and a collapsed configuration. The cover has a bottom portion and a side portion extending upwardly away from the bottom portion. The side portion includes a first rigid plate and a second rigid plate connected together by a hinge. The side member is collapsible along the film hinge for adjustment from the transport configuration to the collapsed configuration. In addition, this disclosure relates to bicycle transport bags including a wrapping device. The wrapping device is configured to at least partially wrap a frame received in the interior space. The wrapping device is fixedly connected to the cover for the wrapping. In addition, the disclosure relates to a headset protection device having a fastening device for retaining a bicycle fork in a head tube.

36 Claims, 19 Drawing Sheets

(56) References Cited

U.S. PATENT DOCUMENTS 9,821,948 B2 * 11/2017 Noer ................ A45C 5/14
2021/0000234 A1 * 1/2021 Kax ................ B62H 3/02

* cited by examiner

BIKE TRANSPORT BAG AND HEADSET PROTECTION DEVICE

CROSS REFERENCE TO RELATED APPLICATION

This application claims priority to German Application No. 10 2021 113 190.1, filed May 20, 2021, which is hereby incorporated by reference in its entirety.

FIELD

The present disclosure relates to a bicycle transport bag and a headset protection device.

BACKGROUND

Passionate cyclists also take their bikes with them on long-distance trips. For example, racing bikes are taken to competitions by train, bus and/or plane. Many mountain bikers also take their mountain bikes with them on airplane trips, for example, to ride challenging trails with their high-quality bikes on vacation as well. Especially for users who take their bikes on long-distance trips, the bikes are usually very high quality and therefore expensive. With this, there is a need to adequately protect bicycles with bags also during transportation. At the same time, bicycles are also relatively large and bulky. Thus, there is also a need to be able to comfortably handle the bicycle transport bag with and without the bicycle accommodated in it.

BRIEF SUMMARY

A first aspect of this disclosure relates to a bicycle transport bag with a cover. The bicycle transport bag is adjustable between a transport configuration in which a bicycle is receivable in an interior space of the cover, and a collapsed configuration. In the transport configuration, the bicycle transport bag may well protect the bicycle received therein. To receive, it may be necessary to at least partially disassemble the bicycle. For example, a handlebar and/or respective wheels may be removed from a frame of the bicycle. For example, in the transport configuration, the bicycle transport bag is at least large enough to accommodate a frame of the bicycle within the interior space of the bicycle transport bag. In the transport configuration, the bicycle transport bag can be used to transport the bicycle. In the collapsed configuration, the bicycle transport bag may have compact exterior dimensions. The bicycle transport bag may be smaller in the collapsed configuration than in the transport configuration. Thus, the bicycle transport bag can be easily handled without a bicycle transported therein and can be stored in a space-saving manner. For example, in the collapsed configuration, no bicycle may be receivable in the bicycle transport bag. For example, in the collapsed configuration, the bicycle transport bag may have no interior space at all. For example, the cover may be at least partially folded or unfolded for adjustment.

The cover has a bottom portion and a side portion extending upwardly away from the bottom portion. The side portion may be configured to be folded and unfolded, for example. The side portion may be adjustable, for example by being deformed. The side portion may, for example, include padding, particularly a foam insert. The bottom portion may be configured to stand on the ground, in particular when transporting a bicycle. In this case, for example, a frame of the bicycle may be received upright in the bicycle transport bag. The bottom portion can be formed as a rigid part, for example comprising a plastic shell. Rollers for pulling the bicycle transport bag over the ground can be arranged on the bottom portion on a side facing away from the side portion. The bottom portion may form a bottom of the bicycle transport bag. The side portion may form respective side walls and/or a top of the bicycle transport bag.

The side portion comprises at least a first rigid plate and a second rigid plate connected to each other by a hinge. The side portion is foldable along the film hinge for adjustment from the transport configuration to the collapsed configuration. By folding, the two rigid plates can be arranged, for example, side by side with their flat side. In the transport configuration, the two rigid plates may, for example, be arranged substantially in one plane, form a mutual extension, and/or both extend upwardly from the bottom portion. The hinge may be formed as an integral part of the side portion. The hinge may be formed as a film hinge. A film hinge is inexpensive. In addition, a film hinge can easily be configured without hard and in particular metallic parts, which could otherwise scratch the bicycle. The hinge may allow deformation of the side portions despite the rigid plates. The rigid plates may provide particularly good protection of the bicycle during transport. For example, the plates may be plastic or metal plates. For example, the rigid plates can be flat. Thus, it is possible to provide protection equivalent or nearly equivalent to a transport bag with a hard shell, but still allowing a collapsed state. Collapsing the bicycle transport bag also does not require removal of any parts due to the hinge. For example, no frame needs to be detached, partially detached, and/or partially removed. Thus, the configuration of the bicycle transport bag can be changed particularly quickly and conveniently. In addition, there is no risk of loss of parts or damage due to disassembly and assembly of parts.

For example, on two opposite sides of the bicycle transport bag, the side portion can have each a first rigid plate and a second rigid plate, which are connected to one another by means of a hinge in each case, in particular by means of a film hinge in each case. For example, each side of the bicycle transport bags may be foldable in this manner. For example, in the case of a substantially rectangular basic shape of the bottom portion, the longer sides may each have at least two rigid plates and a film hinge. In this way, the bicycle transport bag is particularly well collapsible and a particularly large side area is protected by the rigid plates. Each side may also have more than two rigid plates. For example, each side may have three rigid plates, each of which is connected in pairs by means of a film hinge. In this way, the bicycle transport bag can be folded particularly compactly.

Respective following explanations of features and configurations may apply equally to some, several, or all of the plates and/or hinges hereinafter, as applicable.

In an embodiment of the bicycle transport bag, it is provided that at least the first or the second rigid plate is fixedly integrated in the side portion. For example, both rigid plates or all rigid plates may be fixedly integrated into the side portion. For example, the side portion may comprise a textile element in which the rigid plates are integrated. For example, the rigid plates may be sewn into the textile element. The textile element can provide additional protection and form the film hinge. The side portion can comprise one associated textile element per side with rigid plates.

In an embodiment of the bicycle transport bag, it is provided that the bottom portion is trough-shaped. This allows the bicycle to be easily fixed in place on the underside. The fixation of the side portion can thus be simple. Trough-shaped can mean that the bottom portion has a bottom wall and a circumferential side wall extending upwards therefrom.

In an embodiment of the bicycle transport bag, it is provided that in the transport configuration of the bicycle transport bag, the rigid plates have an upward extension that is less than or equal to a width of the bottom portion. In the collapsed configuration of the bicycle transport bag, the panel elements can then be folded so that they do not protrude laterally beyond the bottom portion. For example, the rigid plates may be sized to be placed within the trough-shaped bottom portion.

In an embodiment of the bicycle transport bag, it is provided that the hinge extends in the longitudinal direction of the bicycle transport bag. This orientation of the hinge allows the bicycle transport bag to have particularly few hinges and to be quickly and easily adjusted between configurations thereof. A longitudinal direction may correspond to a forward-backward direction of the bicycle received in the bicycle transport bag. The longitudinal direction may correspond to a largest extent of the bicycle transport bag and/or the bottom portion.

In an embodiment of the bicycle transport bag, it is provided that at least one of the rigid plates in the collapsed configuration of the bicycle transport bag is accommodated in the bottom portion, in particular all rigid plates. In an embodiment of the bicycle transport bag, it is provided that the rigid plates do not extend beyond the bottom portion in a longitudinal direction and/or a transverse direction in the collapsed configuration. The transverse direction may be orthogonal to an upright direction and/or the longitudinal direction. Thus, in the collapsed configuration of the bicycle transport bag, these plates are protected from impacts to the narrow edges thereof, which could otherwise quickly damage the bicycle bag. For example, narrow edges of the rigid plates could otherwise quickly chafe or puncture a textile element.

In an embodiment of the bicycle transport bag, it is provided that the rigid plates in the collapsed configuration are arranged with their flat side lying on top of each other and/or on a top side of the bottom portion. This enables a compact collapsed configuration of the bicycle transport bag.

In an embodiment of the bicycle transport bag, it is provided that the bicycle transport bag comprises a locking device. The locking device may be configured to lock the side portion to the bottom portion in the collapsed configuration. This may prevent unwanted adjustment of the bicycle transport bag and/or unwanted movement of the side portion relative to the base portion in the collapsed configuration of the bicycle transport bag. This makes the bicycle transport bag particularly easy to handle in its collapsed configuration. The locking device may comprise at least one tightening strap. The tightening strap may be fixedly attached to the side portion or the bottom portion at one end and may be hookable to an area of the bottom portion or the side portion at the other end. The tightening strap may have a hook at one end.

In an embodiment of the bicycle transport bag, it is provided that the side portion includes an outside pocket. The outside pocket may be configured to receive the locking device. For example, the tightening strap may be received in the outside pocket when the tightening strap is not needed. For example, in the transport configuration of the bicycle transport bag, the locking device may be received in the outside pocket because it is not needed at that time and could otherwise interfere. In addition, this can prevent tearing or jamming, for example on a luggage conveyor. The outside pocket can be configured to be closable, for example by means of a hook-and-loop fastener.

In an embodiment of the bicycle transport bag, it is provided that the bicycle transport bag comprises a closure device which is configured to be adjusted in the transport configuration of the bicycle transport bag between an open state, in which access to an interior space of the bicycle transport bag is allowed, and a closed state, in which access to the interior space is blocked. This allows for improved protection of the received bicycle. The closure device may be configured for locking, for example by means of a lock. In this way, protection against theft can be provided.

In an embodiment of the bicycle transport bag, it is provided that the closure device is configured to block adjustment of the bicycle transport bag from the transport configuration of the bicycle transport bag to the collapsed configuration of the bicycle transport bag in the closed state of the closure device. This can prevent accidental collapse of the bicycle transport bag. In addition, this can eliminate the need for a separate collapsing block.

In an embodiment of the bicycle transport bag, it is provided that the closure device is configured to release an adjustment of the bicycle transport bag from the transport configuration of the bicycle transport bag to the collapsed configuration of the bicycle transport bag in the open state of the closure device.

The closure device may be configured to cause the bicycle transport bag to be adjusted from an intermediate state of the bicycle transport bag between its collapsed configuration and its transport configuration to its transport configuration by its closure. Thus, by closing the interior, the bag can be simultaneously adjusted accordingly, facilitating its use. The closure device may be configured to cause the bicycle transport bag to be adjusted from its transport configuration to its intermediate state between its transport configuration and its collapsed configuration by its opening. In this way, access to the interior space can be released in a particularly generous manner. In addition, after removal of the bicycle, the bag can be adjusted particularly quickly and easily into the collapsed state.

In an embodiment of the bicycle transport bag, it is provided that the closure device is configured to connect two sections of the side portion to each other in the closed state of the closure device. In this way, the side portion can be tightened by the closing. The internal tension generated in the side portion by the closing can thus pull respective panels into their position in the transport configuration of the bicycle transport bag, in particular into an upright position. Each section can be formed by a textile element of the side portion, in particular a textile element firmly connected to the bottom portion on each side. Alternatively or additionally, it is provided that the closure device is configured to separate the two sections of the side portion from each other in the open state of the closure device. One of the two section of the side portion can be attached to one side of the bottom portion and another of the two sections of the side portion can be attached to an opposite side of the bottom portion.

In an embodiment of the bicycle transport bag, it is provided that the closure device comprises a zipper. The zipper may form a lightweight and easy-to-use closure. The zipper may extend at least regionally along an edge of the side portion. This allows the zipper to be easily reached for adjustment thereof. In addition, the side portion can be easily tightened in this way.

In an embodiment of the bicycle transport bag, it is provided that the zipper is configured to releasably connect the side portion to the bottom portion at one end region and/or to releasably connect the side portion to the bottom portion at an opposite end region. This may be an end region of the zipper and/or of the bottom portion.

The zipper may extend upwardly in an upright direction from one of the end regions in the transport configuration of the bicycle transport bag along an edge of the side portion, subsequently extend longitudinally therefrom along an upper side edge of the side portion, and subsequently extend downwardly therefrom in the upright direction along an edge of the side portion to the other of the end regions. Respective edges and/or regions may be connected by a corner, particularly a rounded corner. The zipper may be spaced from the respective edges. In the region of a corner, the distance of the zipper to an edge may be less than in the region of a straight extension. This may facilitate closing of the zipper and/or increase a tightening of the side portion by closing.

In an embodiment of the bicycle transport bag, it is provided that the side portion is self-supporting in the transport configuration of the bicycle transport bag. In this way, the received bicycle can be protected particularly well even without a frame or use of support tubes or the like since the side portion does not have to be supported on the received bicycle. In particular, protection can thus also be provided from above by the bicycle transport bag. Self-supporting means, for example, that a support frame can be dispensed with. The side portion may be self-supporting due to an internal tension caused by the closure device. For example, the side portion may be self-supporting due to the connection of the two sections of the side portion by the closure device. Otherwise, the side portion may be substantially slack for ease of folding.

A second aspect of this disclosure also relates to a bicycle transport bag. However, the bicycle transport bag may have respective features, embodiments and advantages of the bicycle transport bag according to the first aspect, which are to be taken from the latter, and vice versa. However, the bicycle transport bag according to the second aspect may, for example, not be adjustable between a transport configuration and collapsed configuration.

The bicycle transport bag according to the second aspect comprises a cover. The cover comprises a bottom portion and a side portion. A bicycle is receivable in an interior space of the cover, in particular in a transport configuration.

The bicycle transport bag according to the second aspect comprises a wrapping device configured to at least partially wrap a frame of the bicycle received in the interior space to protect the frame. As a result, the received bicycle is particularly well protected. In particular, thus further parts of the bicycle in the interior space, such as loose pedals, dismounted wheels and/or a dismounted handlebar, cannot scratch the frame or can only do so with a very low probability. Impacts from the outside can also be cushioned in this way. The wrapping device can be configured to provide padding for the bicycle, in particular its frame.

The wrapping device may be firmly attached to an inner side of the cover for wrapping, particularly to the bottom portion and/or a lower end portion of the side portion. Thus, during use to protect the bicycle, the wrapping device can be attached to the inside of the cover. Thus, the wrapping device is always available and cannot be lost. Wrapping the frame is also simplified in this way, since respective wrapping parts can simply be pulled taut.

The wrapping device can be configured to be moved together with the side portion into the collapsed configuration, for example by folding and/or rolling up. In the collapsed configuration, the wrapping device can be received in the base portion, in particular if it is configured in the shape of a trough. In the collapsed configuration, the wrapping device may be arranged at least partially between the bottom portion and the side portion, in particular in the upright direction. The wrapping device can be arranged at least partially between two rigid plates in the collapsed configuration, in particular in the upright direction.

In an embodiment of the bicycle transport bag, it is provided that the wrapping device comprises a first wrapping element and a second wrapping element. This facilitates attachment of the wrapping device to the bottom portion, side portion and/or frame of the bicycle. The two wrapping elements can be stretched or laid tightly over the frame and connected to each other. The two wrapping elements may be formed as flexible elements and/or of a textile. The wrapping elements can have a padding, for example formed by an internally arranged foam.

In an embodiment of the bicycle transport bag, it is provided that the two wrapping elements are configured to be folded over each other with an upper free end portion over the frame for protecting the frame of the bicycle received in the interior space. For example, the upper free end portions can be wrapped over a top tube of the frame. The bicycle can thus be protected from above.

In an embodiment of the bicycle transport bag, it is provided that the two wrapping elements are connected to the bottom portion and/or the side portion at one end region, in particular a lower fixed end region opposite the free end region.

In an embodiment of the bicycle transport bag, it is provided that the two wrapping elements are configured for protecting the bicycle received in the interior space by folding over each another with a front free end portion over a front fork. In this way, the front fork can be secured against twisting and thus additionally protected. In addition, the bicycle can be protected at the front in this way.

In an embodiment of the bicycle transport bag, it is provided that the two wrapping elements are configured to be folded over each other with a rear free end portion over a chain stay to protect the frame of the bicycle received in the interior space. In this way, the bicycle can be protected at the rear.

In an embodiment of the bicycle transport bag, it is provided that the wrapping device comprises a fastening device configured to releasably fasten the wrapping device to the frame of the bicycle and/or the two wrapping elements to each other. For example, the fastening device may be configured to connect corresponding end portions of the two wrapping elements to each other and/or to detachably fasten an end portion of a wrapping element to this wrapping element itself. In this way, the wrapping device can be secured. In this way, undesirable slippage during transport can be prevented particularly well.

In one embodiment of the bicycle transport bag, it is provided that the fastening device has at least one hook-and-loop fastener for connecting the two wrapping elements, in particular a hook-and-loop fastener element on one of the two wrapping elements and a corresponding hook-and-loop fastener element on the other of the two wrapping elements. For example, a hook tape may be sewn to one of the two wrapping elements and a loop tape may be sewn to the other of the two wrapping elements. Hook-and-loop fasteners can be lightweight and easy to handle. In addition, hook-andloop fasteners can be particularly good at absorbing shear forces, which can provide improved fastening for wrapped cushioning on bicycles.

In an embodiment of the bicycle transport bag, it is provided that the wrapping device comprises a receiving device for respective wheels of the bicycle. The receiving device may be configured for receiving the wheels by disassembling the wheels from the frame of the bicycle. For example, the receiving device may have a first receptacle for a front wheel on one of the two wrapping elements and a second receptacle for a rear wheel on another of the two wrapping elements. The receiving device also allows respective wheels to be received in the bicycle transport bag in a padded manner and/or to be locked therein. In this way, the wheels can be transported safely when dismantled, such that the bicycle can be transported in a compact and protected manner.

In an embodiment of the bicycle transport bag, it is provided that at least one of the wrapping elements comprises a pocket for holding a wheel of the bicycle on a side facing away from the frame of the bicycle and/or a side facing the outside of the cover. Thereby, the wrapping element can separate said wheel and the frame from each other, whereby an abutment of these parts against each other during transport can be prevented.

The pocket may be configured to receive a hub of the wheel and/or a brake disc of the wheel. The hub allows the heaviest portion of a wheel to be held securely. The brake disc may be further protected by being received in the pocket. The brake disc may be susceptible to scratches and deformation which can affect braking performance and/or cause unwanted braking noise.

The pocket can be open upward in the upright direction for insertion of the wheel, in particular in a state in which the wrapping element with the pocket is already wrapped around the frame of the bicycle or is otherwise attached thereto. The wheel can thus be inserted into the pocket particularly easily, for example by insertion from above.

The wrapping device can be configured to be arranged between the respective wheel and the frame of the bicycle, in particular during transport of the bicycle with the bicycle transport bag. This can provide padding and/or scratch protection between the frame and the wheels.

The bicycle bag may be configured to receive a wheel on each side of the frame within the interior space of the bicycle transport bag.

In an embodiment of the bicycle transport bag, it is provided that the receiving device of the wrapping device comprises a wheel locking device. The wheel locking device may be configured to lock a wheel held thereon. The wheel may thus be held in addition to, or as an alternative to, the pocket. For example, the wheel locking device may be configured to prevent the wheel from rotating about its axis of rotation within the pocket and/or from slipping out of the pocket. The wheel locking device may comprise at least one loop on one of the wrapping elements, wherein the loop is configured for attachment to a spoke and/or a rim of a wheel. The loop may be closable, for example by means of a hook-and-loop fastener.

In an embodiment of the bicycle transport bag, it is provided that the bicycle transport bag comprises at least one roller attached to an underside of the bottom portion. The roller may allow the bicycle transport bag to be rolled over the ground in the manner of a trolley, ski bag or other piece of luggage. The rollers may be configured to allow rolling of the bicycle transport bag in its collapsed configuration and/or its transport configuration. The bicycle transport bag may comprise a roller pivotally mounted about an upright axis to an end portion of the base member, in particular being detachably mounted to the base member. The pivotable roller may facilitate maneuvering during towing. The roller may be configured to be detached to prevent damage during transport, for example in a cargo hold of an aircraft, and/or to allow a more secure upright position on the ground. The bicycle transport bag may alternatively or additionally include a pair of parallel rollers attached to an opposite end portion of the base member, which are in particular fixedly aligned and/or permanently attached to the base member. A pair of permanent and/or fixedly aligned rollers may increase a driving stability when pulling the bicycle transport bag.

In an embodiment of the bicycle transport bag, it is provided that the bicycle transport bag comprises at least one handle arranged on the side portion, in particular wherein the handle is arranged in an externally accessible manner on the side portion in the transport configuration of the bicycle transport bag and the collapsed configuration of the bicycle transport bag. Alternatively or additionally, it may be provided that the bicycle transport bag comprises at least one handle arranged on the bottom portion, in particular wherein the handle is arranged on the bottom portion in an externally accessible manner in the transport configuration of the bicycle transport bag and in the collapsed configuration of the bicycle transport bag. Thus, the bicycle transport bag can be easily handled in either configuration. For example, a handle may be arranged externally on a side portion such that it is arranged externally even after the side portion is collapsed.

In an embodiment of the bicycle transport bag, it is provided that the side portion comprises an internal pocket, in particular a pocket closable by means of a zipper. The pocket may allow stowage of equipment and disassembled smaller bicycle parts, such as pedals. This may prevent movement and/or collision of these items during transport with the frame, handlebars and/or wheels of the bicycle. The pocket may include a gusset to be able to provide a large storage space. The gusset may extend longitudinally, for example. For example, the pocket may not extend across the hinge. This allows small items, such as tools, for example a tire lifter, to remain in the pocket and provide little or no obstruction to adjusting the bicycle transport bag from its transport configuration to its collapsed configuration. For example, two pockets or two portions of a pocket may be provided, one above and one below the film hinge.

In an embodiment of the bicycle transport bag, it is provided that the bicycle transport bag comprises at least one protective bag. The protective bag may be configured to receive a derailleur of the bicycle at least partially. In particular, the protective bag may receive respective rear gears of the rear derailleur and/or a front derailleur of the derailleur. For example, the protective bag may comprise a flexible and/or textile protective element that is around the respective parts of the bicycle. The derailleur may be particularly sensitive and thus extra protection may be provided. The protective bag may be configured to at least partially receive a chain of the bicycle. In this way, the chain can be restricted in its mobility in such a way that it does not jump off the gears during transport. In addition, oil contamination caused by chain movement can be reduced or prevented in this way. The protective bag can be configured to be washable. The protective bag can be detachably attached to the wrapping device. Thus, the protective bag can be removed for cleaning. The protective bag may be fixedly attached to the wrapping device. This allows the protective bag to be available at all times. The protective bag may also be a fundamentally loose part of the bicycle transport bag. The protective bag may be formed in the manner of a wrapping element. The protective bag can be wrapped around parts to be protected and can be fastened thereto with a hook-and-loop fastener.

In an embodiment of the bicycle transport bag, it is provided that the bicycle transport bag comprises a removable bicycle maintenance stand. The bicycle maintenance stand may be configured to keep the frame or even the entire bicycle spaced from the ground to facilitate maintenance and repair work. Thus, the bicycle transport bag can support such work.

In an embodiment of the bicycle transport bag, it is provided that the bicycle maintenance stand comprises a frame holding element. The frame holding element may be releasably attached to the bottom portion. Alternatively or additionally, the frame holding element may be configured to releasably hold the frame of the bicycle to the bottom portion of the bicycle transport bag. In this way, the frame can be held particularly securely on the bottom portion. For example, the frame holding element may be configured to engage with a receptacle for a bicycle axle and/or bicycle hub of the frame of the bicycle. Thus, the frame can also be supported here in the transverse direction, whereby, for example, the same stability can be achieved as with installed wheels. The frame holding element can, for example, have a bar in a frame length and/or inner length of the bottom portion.

In an embodiment of the bicycle transport bag, it is provided that the bicycle maintenance stand comprises a stand which can be detachably connected to the frame holding element. The stand may, for example, be configured as a tripod and/or to allow height adjustment. The wrapping device may be configured to hold respective portions of the stand within the interior space of the bicycle transport bag. For example, respective bars of a tripod stand may be held on the side facing away from the frame of the bicycle when the bicycle is transported, in particular adjacent and/or spaced apart from the wheels optionally arranged on said side. The bars of a tripod stand can also be stowed, for example, laterally next to the frame in the bottom portion.

In an embodiment of the bicycle transport bag, it is provided that the side portion is free of a frame structure. As a result, the bicycle transport bag can be lightweight and/or inexpensive. The rigid plates may nevertheless provide better protection of the bicycle, since there may be larger gaps between respective frame elements than with the plates.

In an embodiment of the bicycle transport bag, it is provided that the wrapping device is detachable from the inside of the cover for maintenance. When the wrapping device is not used to protect the bicycle, it can be removed in this way, in particular by disassembly. For example, the wrapping device may be releasably connected to the cover by means of a hook-and-loop fastener, a snap fastener, and/or a screw. For example, a lower end portion of each wrapping element may be connected to the bottom portion and/or side portion by a plurality of snap fasteners and/or screws, respectively. The connection may be configured to prevent detachment when the bicycle is wrapped, for example due to pulling on the respective wrapping elements. Maintenance may include, for example, replacing, cleaning and/or repairing at least one of the wrapping elements.

A third aspect of this disclosure relates to a headset protection device for a bicycle transport bag. The headset protection device may, for example, be provided for the bicycle transport bag according to the first and/or second aspect or may also be a part of these bicycle transport bags. Respective further features, embodiments and advantages can be taken from the descriptions of the first and second aspects.

The headset protection device comprises a protection element configured to at least partially enclose a head tube of a frame of a bicycle, a top tube of the frame of the bicycle, and/or a bottom tube of the frame of the bicycle in the bicycle transport bag. For example, the protection element may be formed as a flexible and/or textile protective element. The protection element may comprise a padding, in particular formed by an inner foam element. The protection element may be configured in the manner of a wrapping element. The protection element may be wrapped around parts to be protected and may be fastened thereto with a hook-and-loop fastener.

The headset protection device comprises a fastening device which is configured to retain a bicycle fork of the bicycle in the head tube, in particular when the stem of a bicycle handlebar has been detached from the bicycle fork. Thus, the bicycle handlebars can be disassembled while the bicycle fork still cannot be detached from the frame. For example, the headset protection device may be attached to the frame and bicycle fork before the bicycle handlebars are detached and/or before the frame is packed into the bicycle bag. This can make handling much easier and also improve transport protection.

In an embodiment of the headset protection device, it is provided that the fastening device of the headset protection device comprises a tensioning device which is configured to tension the bicycle fork of the bicycle from below against the head tube. For example, the tensioning device may engage the top tube and/or the bicycle fork for this purpose. The tensioning device may comprise a tensioning strap attached to the protection element.

In an embodiment of the headset protection device, it is provided that the headset protection device is configured to hold the bicycle handlebars disassembled from the bicycle fork. This can be provided in the manner of holding the wheels on the wrapping elements. For example, this holding can also be achieved by means of a loop and a hook-and-loop fastener. When the bicycle handlebars are held, the protection element may be arranged between the bicycle handlebars and the frame of the bicycle. This can prevent the bicycle handlebar from hitting the frame of the bicycle and/or provide cushioning between the frame of the bicycle and the bicycle handlebar.

DETAILED DESCRIPTION

Figure 1:
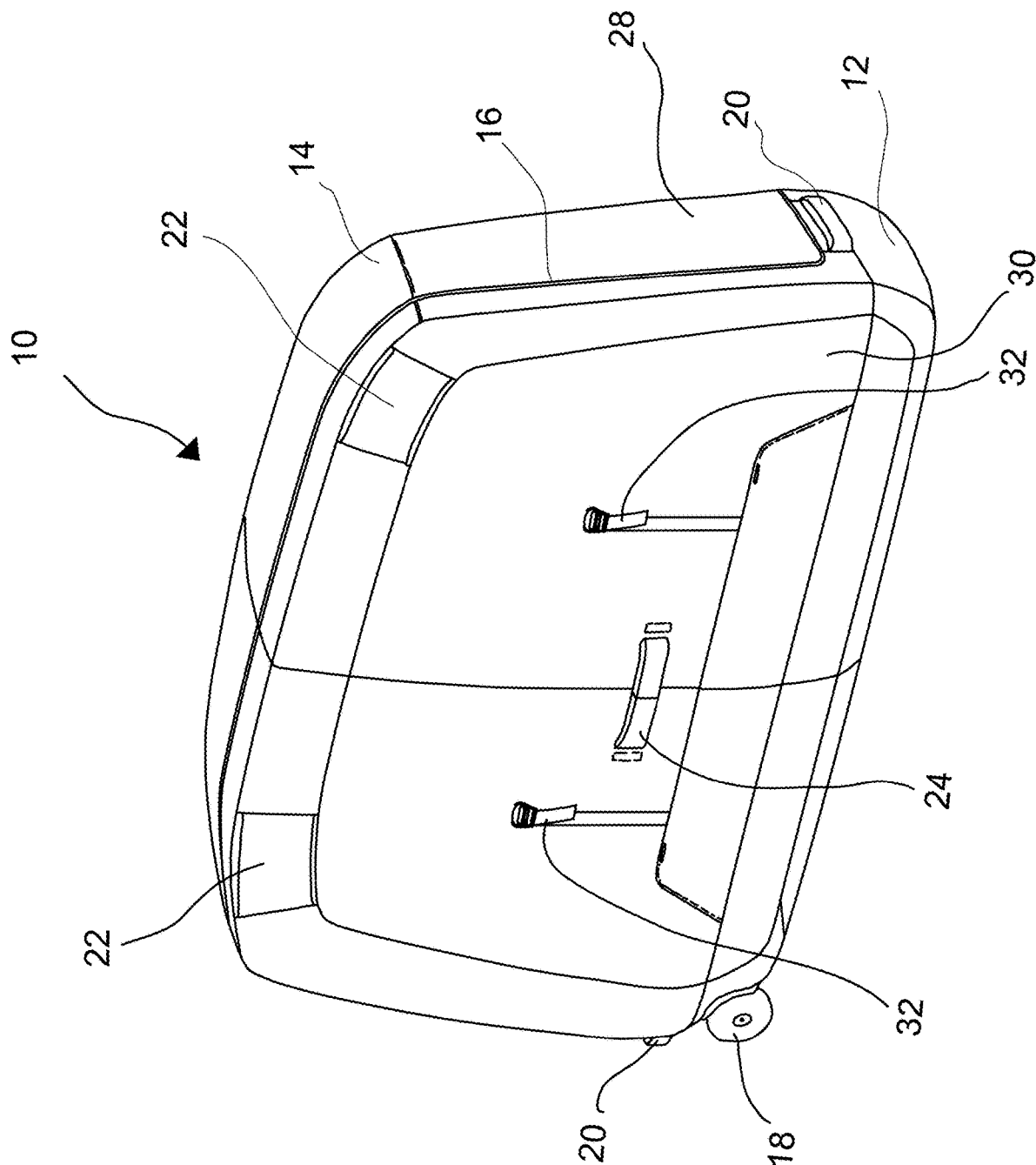
FIG. 1 shows a schematic perspective view of a first embodiment of a bicycle transport bag closed and in a transport configuration.
Figure 2:
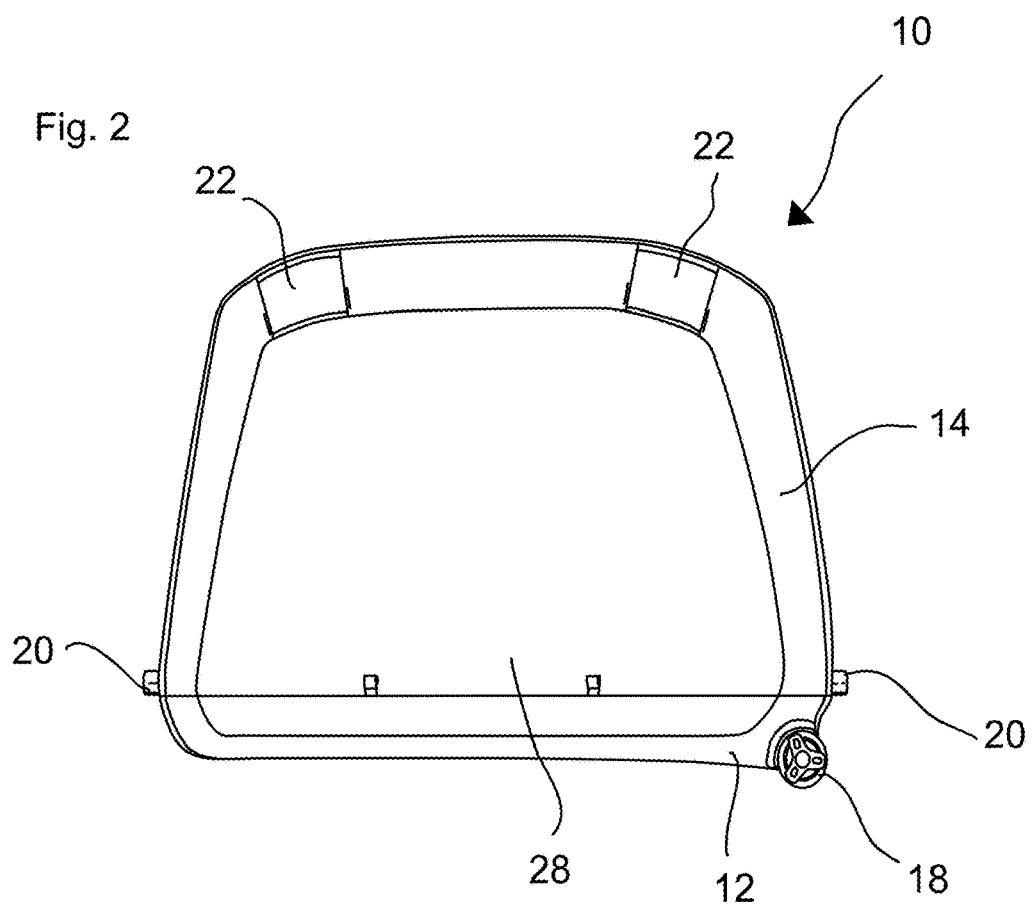
FIG. 2 shows a side view of the bicycle transport bag according to FIG. 1.
Figure 3:
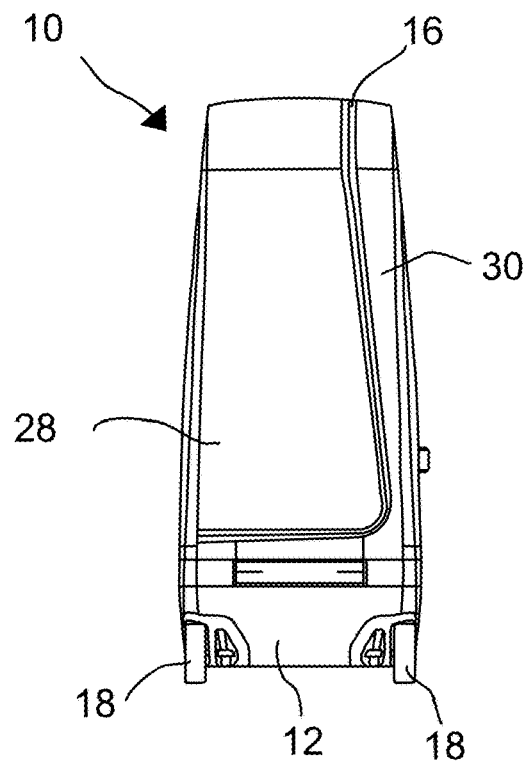
FIG. 3 shows the bicycle transport bag according to FIG. 1 in a frontal view from behind.
Figure 4:
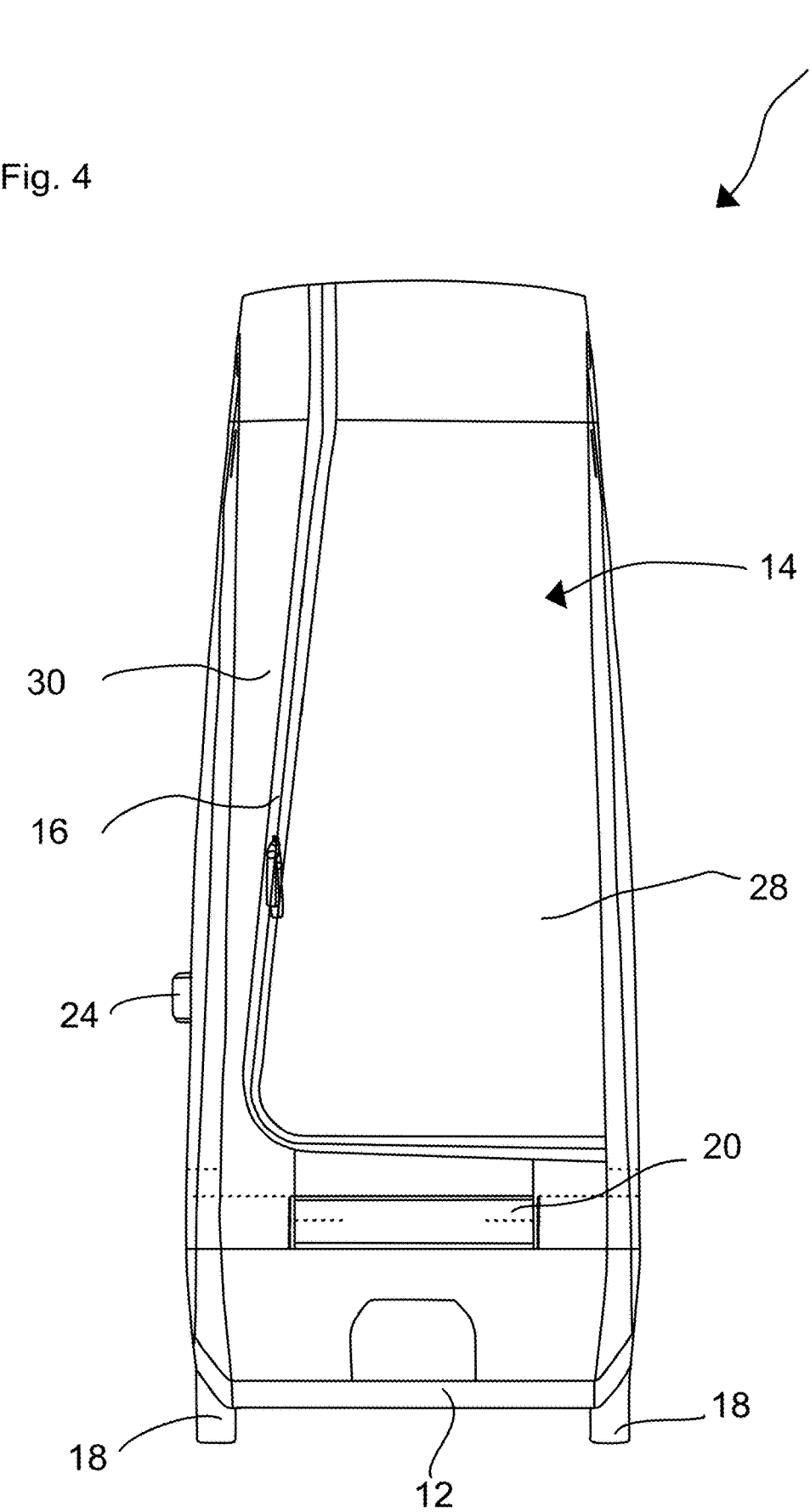
FIG. 4 shows the bicycle transport bag according to FIG. 1 in a frontal view from the front.

FIG. 1 shows a first embodiment of a bicycle transport bag 10. The bicycle transport bag 10 has a bottom portion 12 and a side portion 14, which extends upwardly away from the bottom portion 12 and forms a case of the bicycle transport bag 10. A bicycle is protectively receivable within an interior space of the bicycle transport bag 10. The bicycle transport bag 10 has a closure device in the form of a zipper 16, by means of which the interior space can be unlocked and closed. Attached to the bottom portion 12 on a rear narrow side are a pair of rollers 18, the orientation of which is fixed relative to the bottom portion 12. This allows the bicycle transport bag 10 to be pulled across the ground. For this purpose, and generally for handling the bicycle transport bag 10, the bicycle transport bag 10 has a lower handle 20 on each of the front and rear narrow sides thereof. In addition, lateral upper handles 22 are arranged at the front and rear of each side. Laterally, in a central region, a central lateral handle 24 is also arranged on each side.

The side portion 14 has two sections, each of which is formed by a textile element 28, 30. A first textile element 28 is connected to the bottom side of the base portion 12 on the left side and is also referred to as the left textile element 28. A second textile element 30 is connected to the bottom portion 12 on the right side and is also referred to as the right textile element 30. In the closed state of the bicycle transport bag 10, the two textile elements 28, 30 and thus the two sections of the side portion 14 are connected to each other by the zipper 16. This state is shown, for example, in FIGS. 1 to 4. The zipper runs in such a way that the two textile elements 28, 30 are tensioned against each other and that the side portion 14 is self-supporting. The side portion 14 can therefore stand upright without a frame and without a bicycle in the interior. By opening the zipper 16, the two textile elements 28, 30 are separated from each other. The bicycle transport bag 10 can thus be unfolded, whereby it is in the open state and can be loaded. The two textile elements 28, 30 can thus be unfolded or can simply fall to the side. On the inside, the two textile elements 28, 30 may have padding, for example formed by foam.

Figure 6:
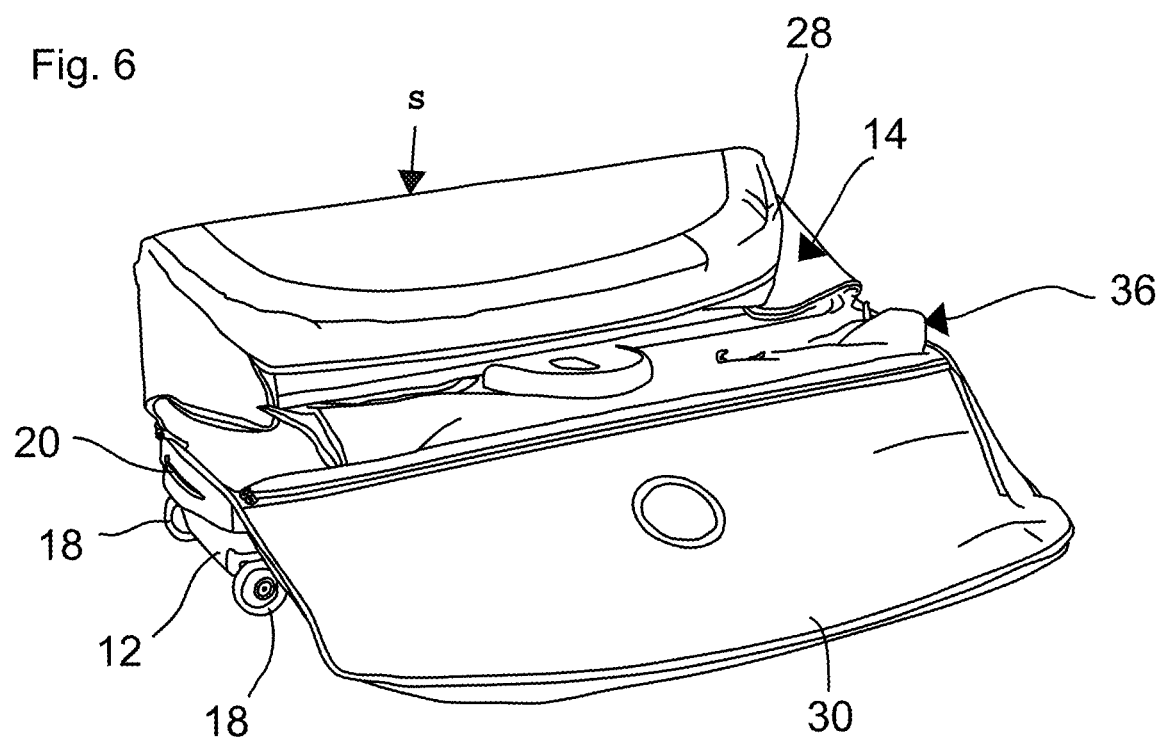
FIG. 6 illustrates in a schematic perspective view how a cover of the bicycle transport bag according to FIG. 1 can be folded.
Figure 9:
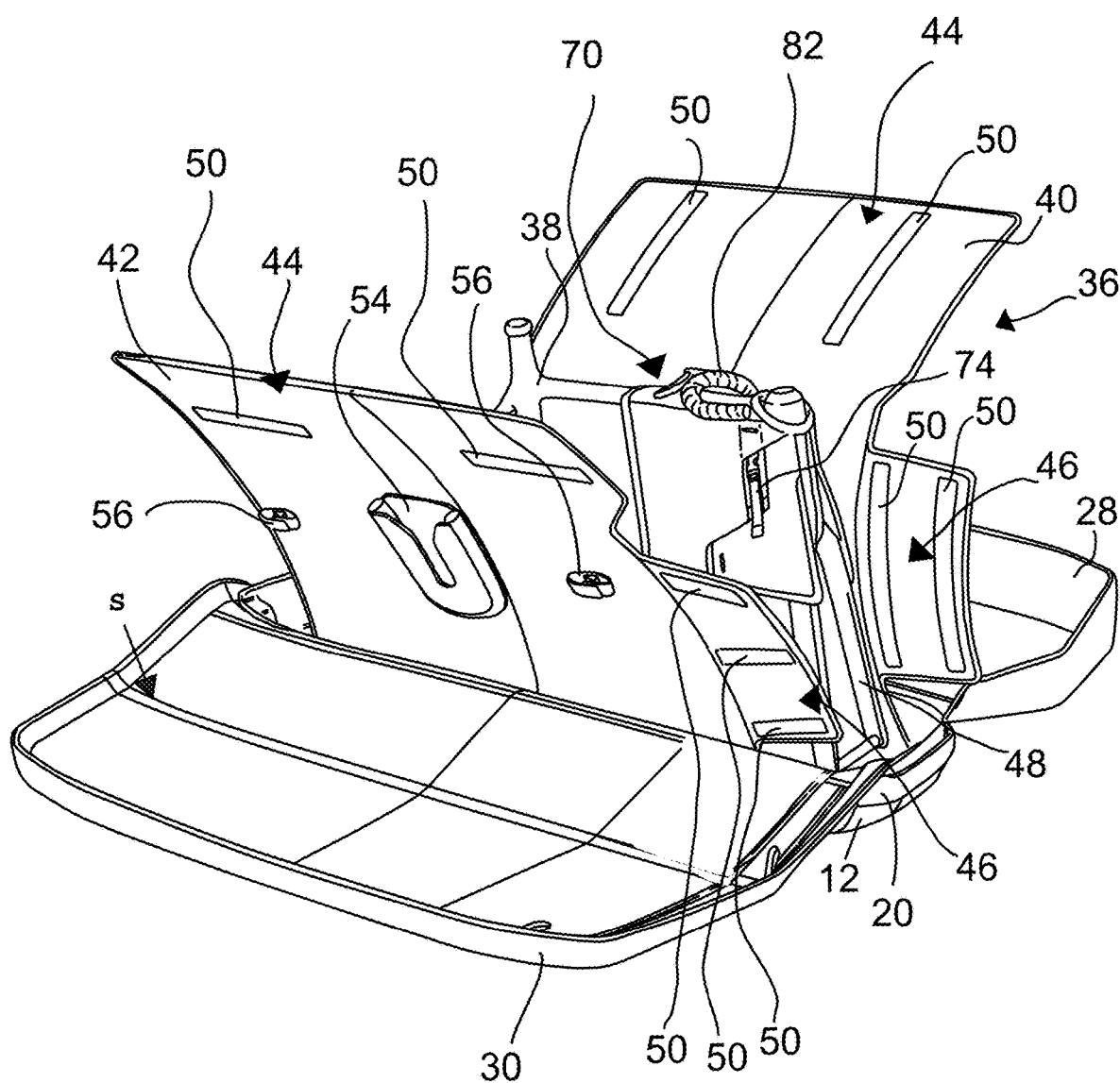
FIG. 9 illustrates in a schematic perspective view how a wrapping device of the bicycle transport bag according to FIG. 1 can protect the bicycle received therein.
Figure 20:
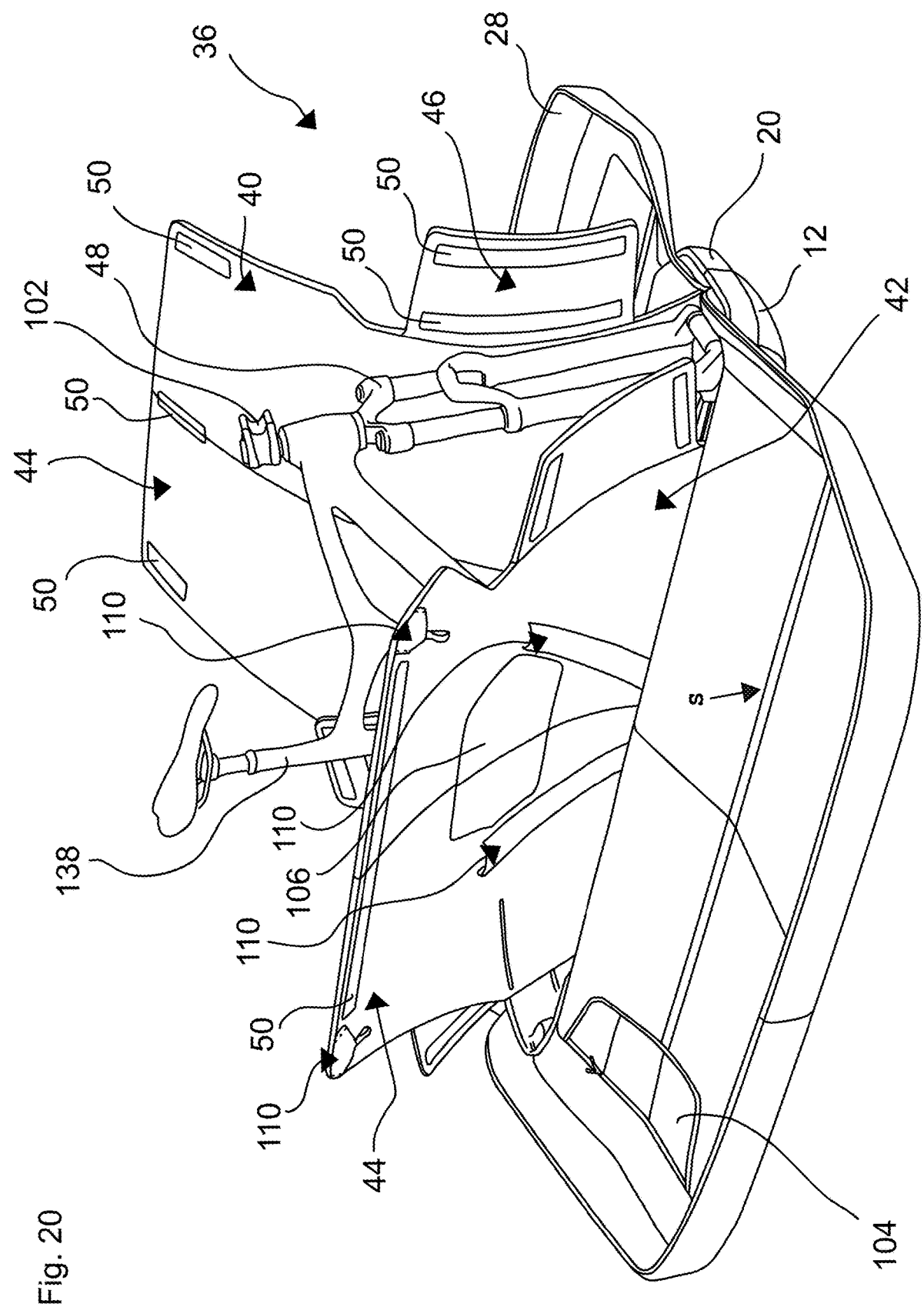
FIG. 20 illustrates in a schematic perspective view how a wrapping device of the bicycle transport bag according to FIG. 18 can protect the bicycle accommodated therein.

At least two rigid plates are arranged in each of the two textile elements 28, 30, which are, for example, fixed by seams. The rigid plates stiffen the side portion 14 and thus provide additional protection for the bicycle accommodated therein. Each pair of adjacent rigid plates on one side of the side member 14, presently in each of the two textile elements 28, 30, are connected to each other by means of a hinge. The hinges extend longitudinally of the bicycle transport bag 10, that is, from the rear narrow side to the front narrow side. Presently, the hinge is formed by the respective textile element 28, 30 itself, which is flexibly in a gap between adjacent rigid panels, thus forming a film hinge. In an embodiment, the hinges are externally concealed. For example, respective hinges may only be visible to a user when the respective textile elements 28, 30 are folded. Thus, the respective hinge may be robust and inexpensive to manufacture. In FIG. 6, FIG. 9 and FIG. 20, a respective hinge in one of the textile elements 28, 30 is indicated by the reference sign S. However, the hinges can also be identifiable, for example due to a seam or a marking. This can make folding easier for the user.

The respective hinges allow the two textile elements 28, 30 to be folded together. Such a folding is illustrated, for example, in FIG. 6, in which the left textile element 28 is folded in. The bicycle transport bag 10 can thus be adjusted from a transport configuration, for example in the open state, to a collapsed configuration.

Figure 5:
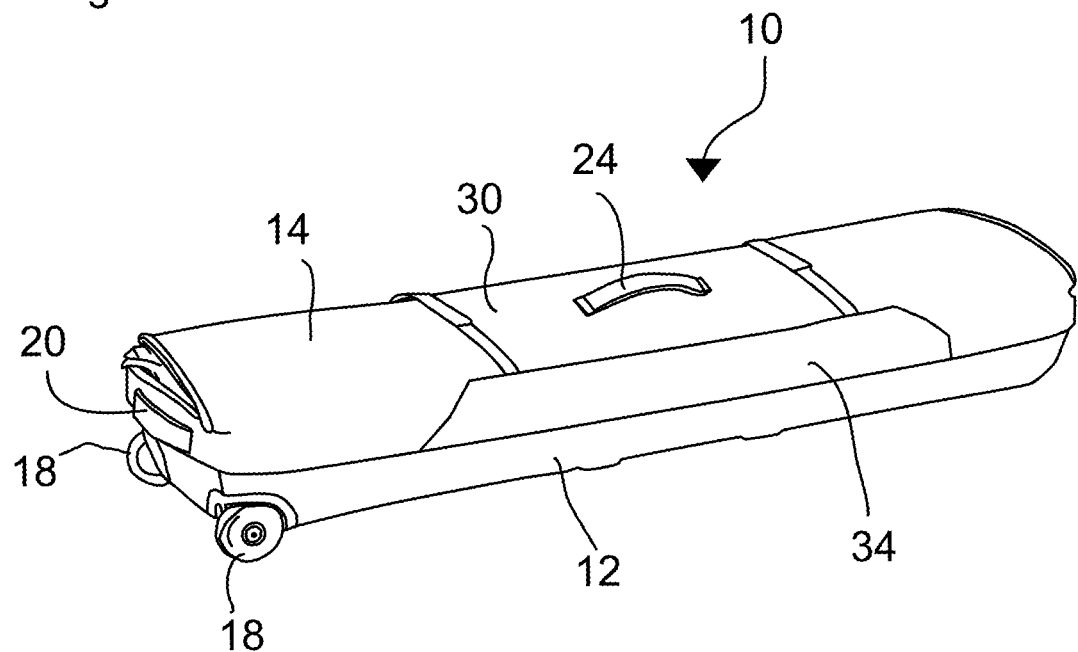
FIG. 5 shows a schematic perspective view of the bicycle transport bag according to FIG. 1 in a collapsed configuration.

The collapsed configuration of the bicycle transport bag 10 is shown in FIG. 5. In the collapsed configuration, both textile elements 28, 30 are fully collapsed so that they lie with respective flat sides of the rigid panels on top of each other and on a floor of the bottom portion 12. The rigid plates have an extension substantially corresponding to a floor surface of the bottom portion 12. Thus, the side member 14 can be compactly folded onto the bottom member 12 despite being stiffened with the rigid plates. The collapsed configuration is thus very compact and easy to handle. In the collapsed configuration, no interior space is provided for receiving the bicycle.

At least one external tensioning strap 32 is arranged on the right textile element 30 or the right side of the bottom portion 12, in the present case two spaced-apart tensioning straps 32. The tensioning straps 32 are configured as tensioning straps with hooks 27 and can thus be hooked in and out. In FIG. 5, it is shown that the tensioning straps 32 are configured to secure the side portion 12 or the two textile elements 28, 30 to the bottom portion 12 in the collapsed configuration of the bicycle transport bag 10. Thus, the two textile elements 28, 30 cannot accidentally unfold and/or detach from the bottom portion 12. In addition, the side center handle 24 is arranged to remain accessible on the top of the bicycle transport bag 10 in the collapsed configuration. Thus, the bicycle transport bag 10 can be easily carried by means of this handle 24.

The right textile element 30 has an outside pocket 34. The outside pocket 34 is closable by means of a hook-and-loop fastener. In the embodiment shown, the tensioning straps 32 are attached to the right textile element 30 on the inside of the pocket 34. The tensioning straps 32 may be stowed within the pocket 34. As a result, the tensioning straps 32 may be disposed within the pocket 34 to protect the bicycle transport bag 10, for example, in the transport configuration of the bicycle transport bag 10. For example, the tightening straps 32 may be prevented from being caught on a luggage conveyor at an airport.

Figure 7:
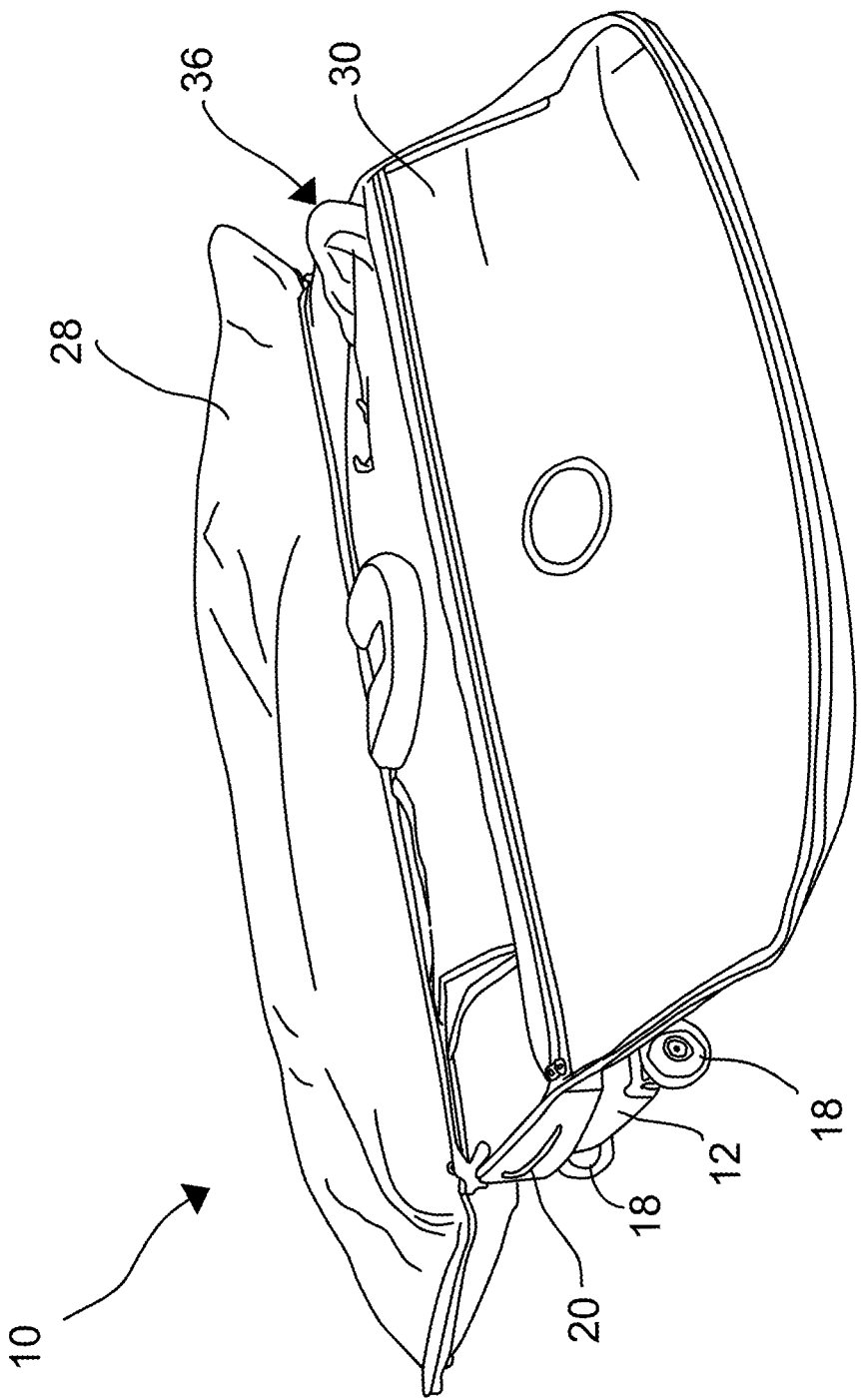
FIG. 7 shows a schematic perspective view of the opened bicycle transport bag according to FIG. 1.

From the collapsed configuration, the bicycle transport bag can be unfolded to the open state by releasing the tension straps 32 and unfolding the two textile elements 38, 30. This corresponds to FIGS. 5 to 7 in that order. Subsequently, by closing the zipper 16, the bicycle transport bag 10 can be adjusted in its closed state and transport configuration, as shown for example in FIG. 1.

Figure 8:
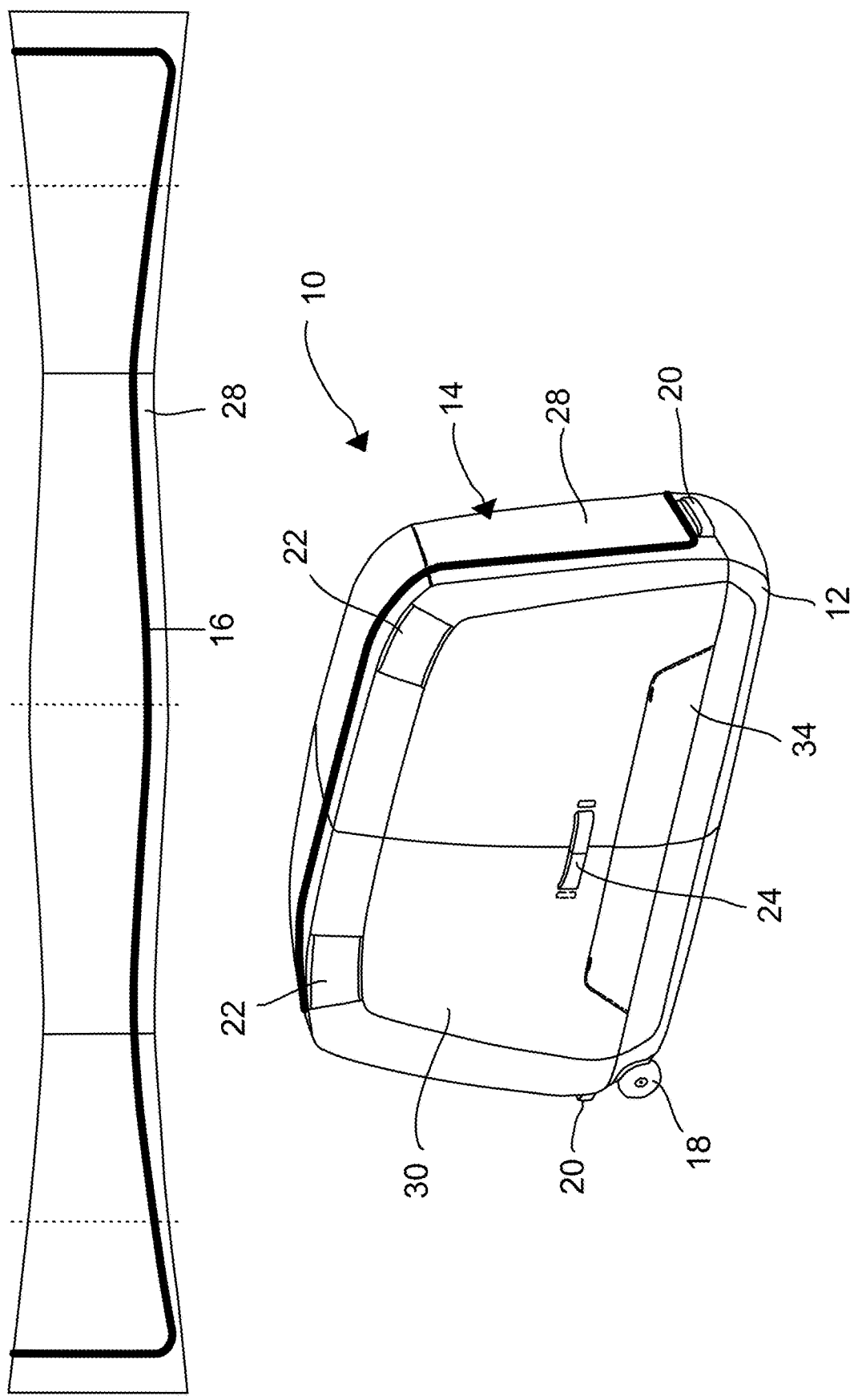
FIG. 8 illustrates a closure device of the bicycle transport bag according to FIG. 1.

FIG. 8 better illustrates the course of the zipper 16 by a thicker illustration as well as an unrolled illustration of an upper side of the left textile element 28 of the side portion 14. As can be seen, the zipper 16 extends from a rear lower end portion of the left textile element 16 first in the transverse direction, i.e., in the horizontal direction when the bicycle transport bag 10 is standing upright, along the rear narrow side of the bottom portion 12. There, the zipper 16 can connect the left textile element 16 to the bottom portion 12. Via a rounded corner, the zipper thereafter extends upwardly in the transport configuration of the bicycle transport bag 10 in an upright direction along an edge of the side portion, more specifically an edge of the left textile element 28. In the corner region, the zipper is closer to the edge to facilitate adjustment and/or to increase an internal tension in the closed state. Thereafter, the zipper 16 extends longitudinally along an upper side edge of the side member, more specifically an edge of the left textile element 28. Thereafter, the zipper 16 extends downwardly in the upright direction along an edge of the side portion, more specifically an edge of the left textile element 28, to the other of the end portions of the bicycle transport bag. Via another rounded corner, the zipper 16 extends to a front lower end region of the left textile element 28 again in the transverse direction, i.e., in the horizontal direction when the bicycle transport bag 10 is standing upright, along the front narrow side of the bottom portion 12. There, the zipper 16 can connect the left textile element 28 to the bottom portion 12. In the corner region, the zipper is closer to the edge to facilitate adjustment and/or increase internal tension when closed. Closing the zipper 16 forces the rigid panels into a substantially vertical orientation when the bicycle transport bag 10 is in an upright position.

FIG. 9 shows a wrapping device 36 of the bicycle transport bag 10, wherein this wrapping device 36 is optional and can also be provided for bicycle transport bags that are not adjustable between the collapsed configuration and the transport configuration. The wrapping device 36 may provide additional cushioning and protection from scratches for the bicycle, particularly for a frame 38 of the bicycle, during transport in the bicycle transport bag 10.

The wrapping device 36 is configured to at least partially wrap the frame 38. For this purpose, the wrapping device 36 has a first, left wrapping element 40 and a second, right wrapping element 42, which are fixedly connected with their lower end region at the left and right sides, respectively, to the base part 12 for the wrapping. The wrapping elements 40, 42 are configured, for example, as flexible textile elements with foam filling as padding. For maintenance of the wrapping elements 40, 42, this connection can be detachable, for example by a screw connection.

The two wrapping elements 40, 42 are configured to be folded over each other with an upper free end portion 44 above the frame 38 for protecting the frame 38 of the bicycle received in the interior space. Such a state is shown, for example, for another embodiment in FIG. 21. For example, the upper free end portion 44 of the right wrapping element 42 is first wrapped over the frame 38, and then the left wrapping element 42 is wrapped over the frame 38 and the free end portion 44 of the right wrapping element 42 located thereon. The upper free end portions 44 are formed at an end portion of the wrapping elements 40, 42 opposite to the lower end portions.

Furthermore, the two wrapping elements 40, 42 each have a front free end region 46, which are folded over one another over a front fork 48 to protect the bicycle received in the interior space. In this case, the wrapping is carried out analogously to the upper free end regions 44.

The wrapping device 36 comprises a fastening device configured to releasably fasten the wrapping device 36 to the frame 38 of the bicycle, the front fork 48, and/or the two wrapping elements 40, 42 to each other. The fastening device has respective hook-and-loop fasteners for this purpose. On the outside of the right wrapping element 42, i.e., on a side facing away from the frame 38 and/or facing the right textile element 30, hook-and-loop strips 50 running in the longitudinal direction are sewn on in the upper end region 44 and on the front free end region 46. On the outside of the left winding element 40, i.e., on a side facing the frame 38 and/or facing away from the left textile element 28, hook-and-loop fastener strips 50 running in the upward direction are sewn on in the upper end region 44 and on the front free end region 46. In this way, equally good fastening can be achieved in each case for differently dimensioned frames. For example, in order to protect a paint of the bicycle from scratches, respective hook-and-loop fastener strips 50 facing the frame 38 of the bicycle are formed as the loop side or fluffy side of the respective hook-and-loop fastener, and respective hook-and-loop fastener strips 50 facing away from the parts of the bicycle are formed as the hook side of the respective hook-and-loop fastener.

Figure 10:
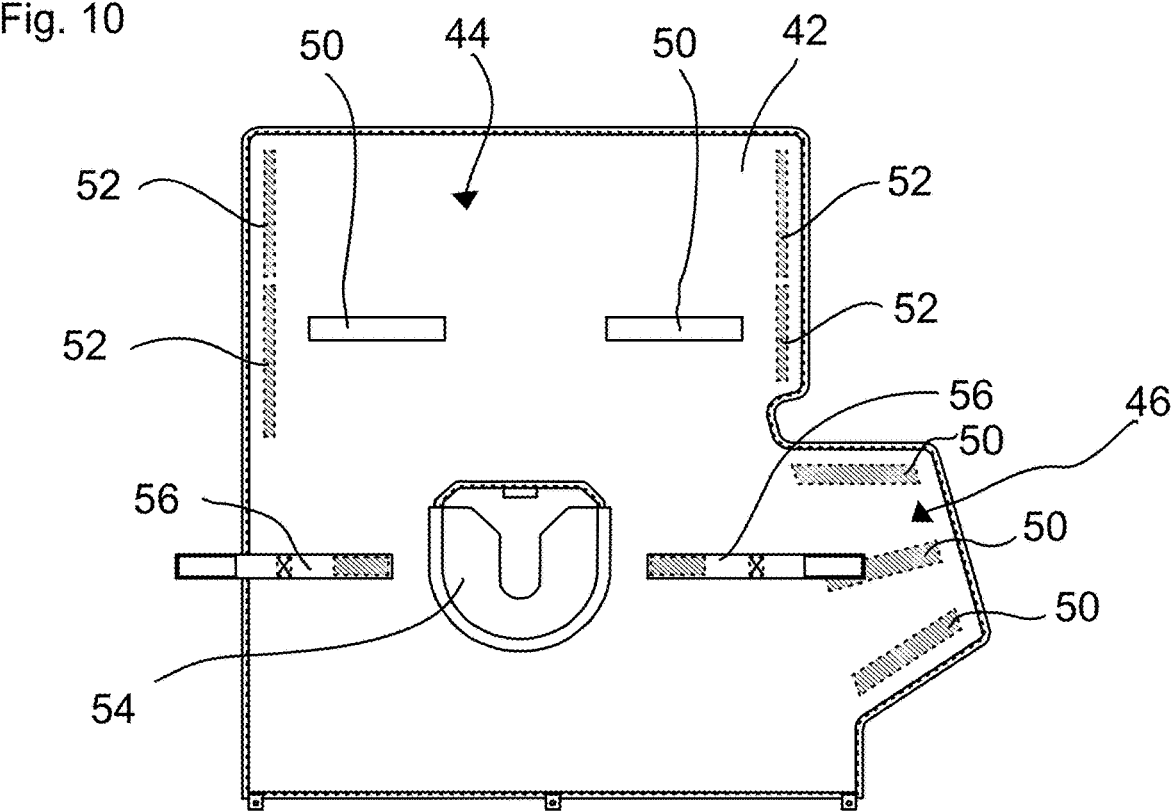
FIG. 10 shows a first wrapping element of the wrapping device of the bicycle transport bag according to FIG. 1 in a side view.

FIG. 10 shows the right wrapping element 42 in an external side view. Additional hook-and-loop strips 52 can be seen on the inside, which provide further fastening options. In addition, the right wrapping element 42 has a pocket 54 which is configured to hold a wheel on the side facing away from the frame 38 of the bicycle. This wheel is thus separated from the frame 38 of the bicycle by the right wrapping element 42. The wheel can be easily inserted into the pocket 54 from above with its hub and/or a disc of a disc brake in the upright direction from above. In addition, the right wrapping element 42 includes a wheel locking device configured to lock a wheel held in the pocket 54 to the right wrapping element 42 by means of two loops 56 closable by means of a hook-and-loop fastener. The loops 56 may be wrapped around a rim and/or spokes of the wheel to prevent rotation and other movement of the wheel relative to the right wrapping element 42. In the external side view of the left wrapping element 40 in FIG. 10, it can be seen that the left wrapping element 40 also includes such a pocket 54 for holding another wheel of the bicycle, the wheel also being lockable by means of respective loops 56 of a wheel locking device.

Figure 11:
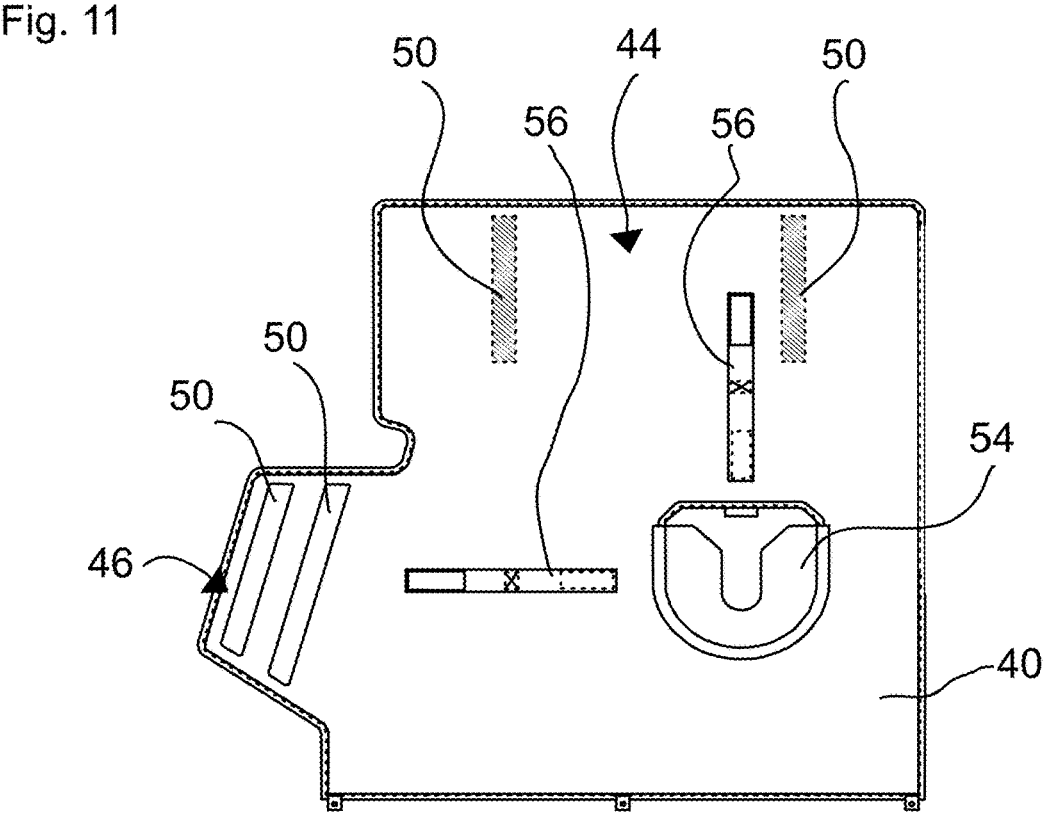
FIG. 11 shows a second wrapping element of the wrapping device of the bicycle transport bag according to FIG. 1 in a side view.

In FIGS. 10 and 11, it can also be seen that the two wrapping elements 40, 42 have bottom eyelets for screwed attachment to the base portion 12.

Figure 12:
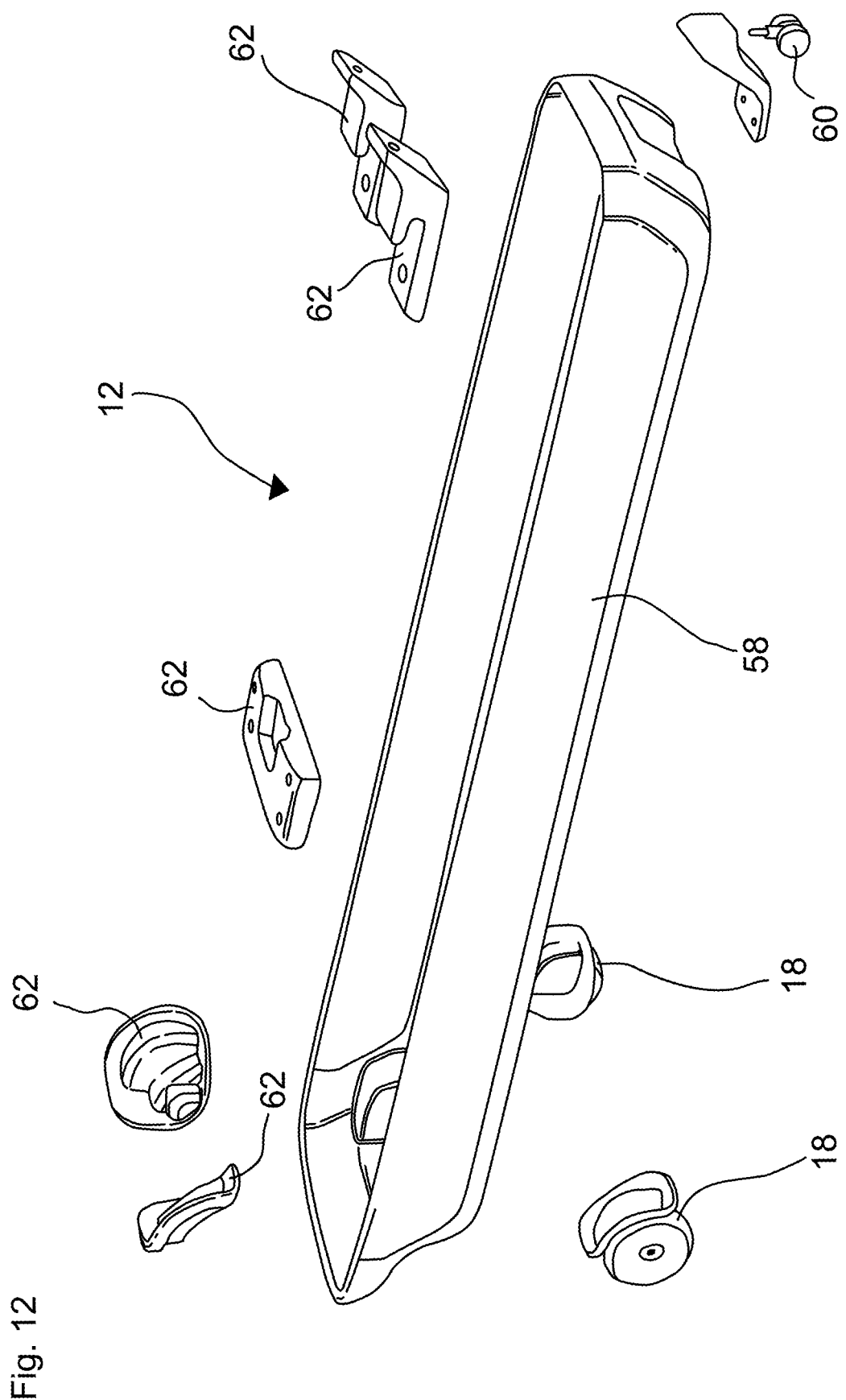
FIG. 12 shows a schematic perspective exploded view of a bottom portion of the bicycle transport bag according to FIG. 1.
Figure 13:
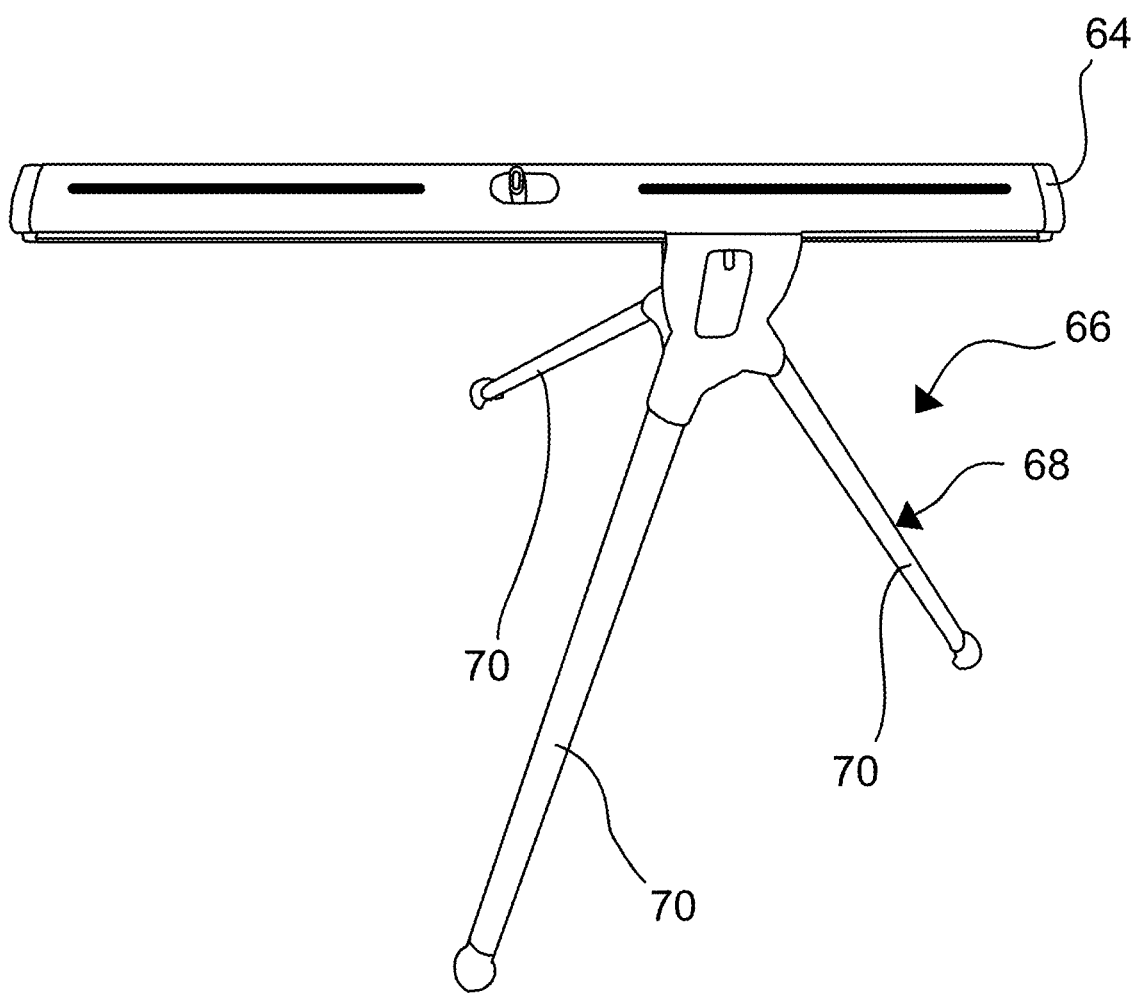
FIG. 13 shows a schematic perspective view of a bicycle maintenance stand removed from the bicycle transport bag according to FIG. 1.

The bottom portion 12 is shown in an exploded perspective view in FIG. 12. The bottom portion 12 has a trough-shaped bottom element 58. Attached to the bottom of the bottom element 58 at the rear is the pair of fixed rollers 18. Attached to the front is another releasably attached roller 60, which is pivotable about an upright direction. When not needed and/or for protection thereof, the roller 60 may be removed. The bottom portion 12 also includes a number of different holding elements 62. The holding elements 62 may be configured to retain the frame 38 and/or the front fork 48 on their underside. Alternatively or additionally, the holding elements 62 are configured to hold a frame holding element 64 of a bicycle maintenance stand 66. Such a bicycle maintenance stand is shown in FIG. 13. The frame holding element 64 is configured to hold the frame 38 and/or the front fork 48 on the underside. Various adapters may be provided for this purpose. The bicycle maintenance stand 66 comprises a stand 68 which is detachably connectable to the frame holding element 64. The stand 68 may, for example, be disassembled into its individual legs and received separately in the bicycle transport bag 10. In the example shown, the stand 68 is configured as a tripod, which can be configured to be height adjustable.

Figure 14:
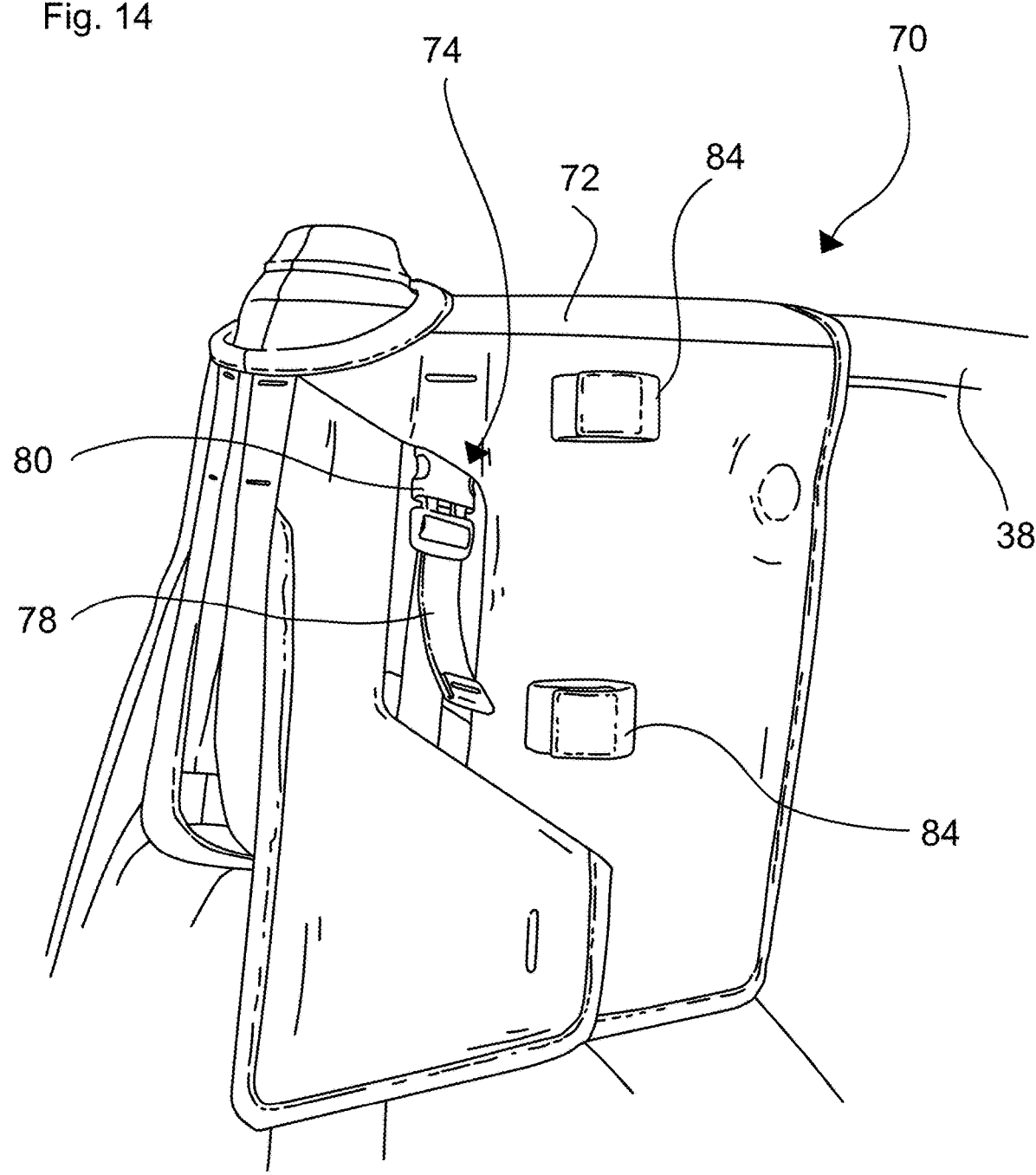
FIG. 14 shows a schematic perspective view of a headset protection device of the bicycle transport bag according to FIG. 1.

FIG. 14 shows a headset protection device 70 of the bicycle transport bag 10, which is attachable to the frame 38 and the front fork 48, as shown, for example, in FIG. 9. However, the headset protection device 70 can also be used with other bicycle transport bags. The headset protection device 70 comprises a textile protective element 72 that is flexible and includes foam padding. The protective element 72 wraps a top tube, a head tube, and portions of the front fork 48, as shown in FIG. 14. The headset protection device 70 comprises a fastening device 74 configured to retain the bicycle fork 48 of the bicycle in the head tube. This can prevent the front fork 48 from slipping out of the head tube of the frame 38, even when a bicycle handlebar with its stem has been removed from the front fork 48. The fastening device 74 of the headset protection device 70 comprises a tensioning device 76, which includes a tensioning strap 78 sewn to the protection element 72 with a snap lock 80. This allows the tensioning device 76 to be easily attached to the front fork 48 and tension it against the head tube of the frame 38 to secure it.

Figure 15:
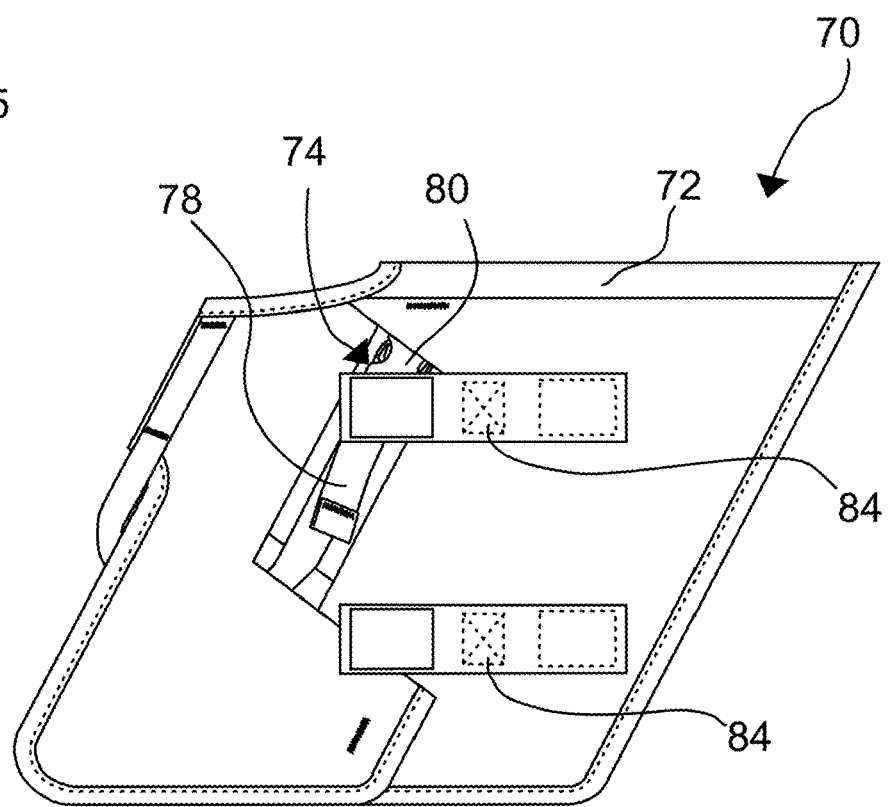
FIG. 15 shows a schematic side view of the headset protection device according to FIG. 15.

The headset protection device 70 is configured to hold the bicycle handlebar 82 that is dismounted from the bicycle fork, which is exemplarily shown in FIG. 9. For this purpose, the headset protection device 70 has two lateral loops 84 which are sewn to the outside of the protection element 72 and can be opened and closed by means of a hook-and-loop fastener. The closed state of the loops 84 is shown in FIG. 14 and the open state of the loops 84 is shown in FIG. 15. When the bicycle handlebar 82 is held, the protection element 72 is thus arranged between the frame 38 and the bicycle handlebar 82, thereby providing scratch protection.

Figure 16:
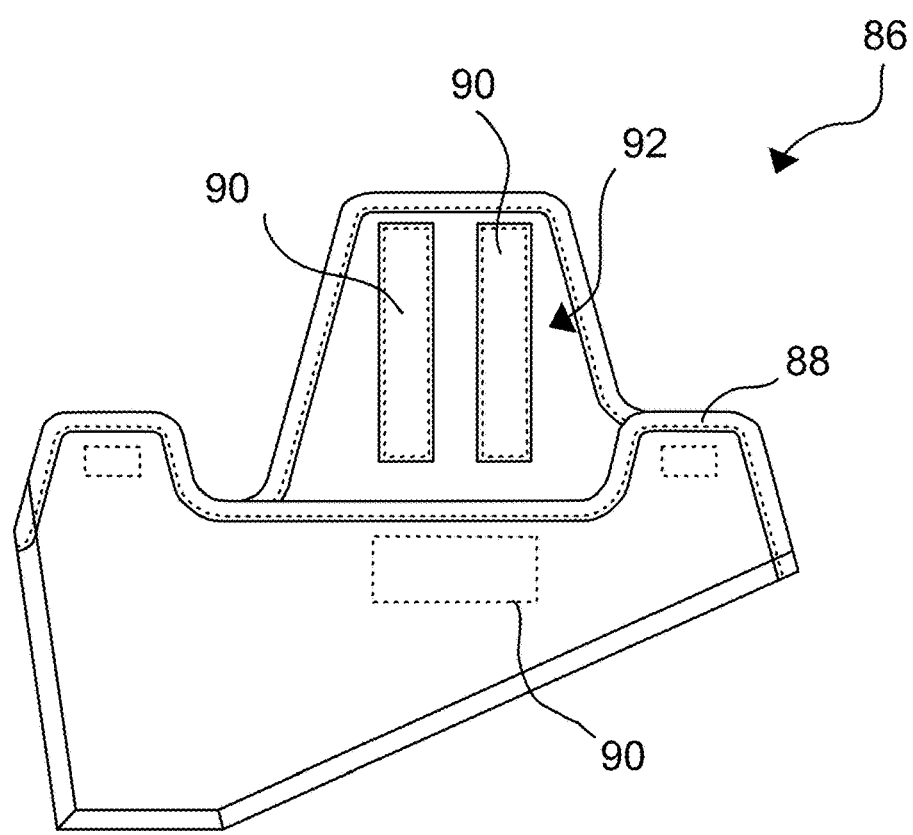
FIG. 16 shows a schematic side view of a protective bag removed from the bicycle transport bag according to FIG. 1.
Figure 17:
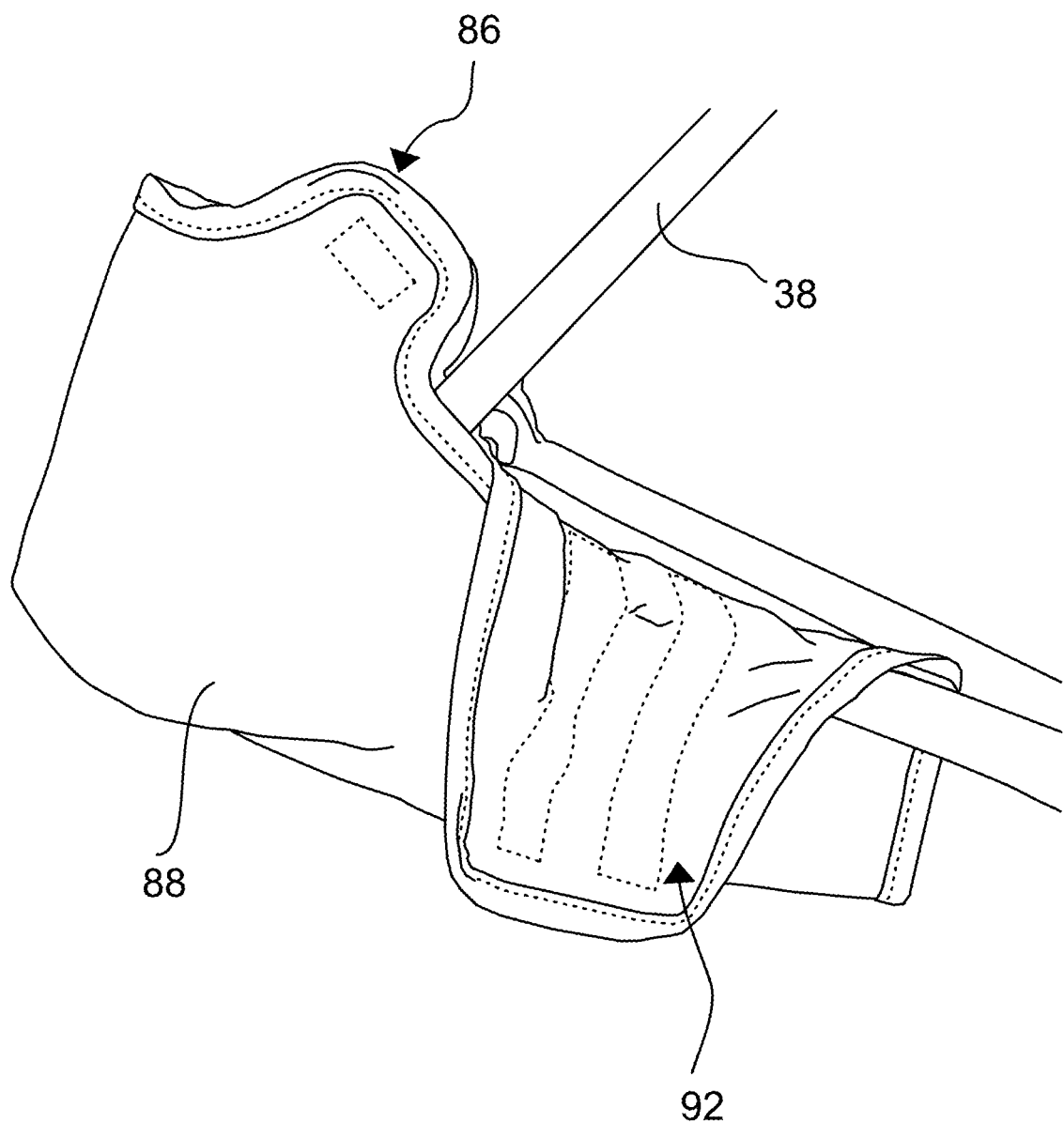
FIG. 17 shows a schematic perspective view of the protective bag according to FIG. 16, wherein the protective bag is attached to a frame of a bicycle.

FIG. 16 shows a protective bag 86 of the bicycle transport bag 10, which is configured to at least partially receive a bicycle chain and/or a derailleur of the bicycle, in particular its rear gears and/or its derailleur. The protective bag 86 has a textile, flexible and padded element 88, which can be attached to a rear chain stay of the frame 38 by means of a hook-and-loop fastener. This is shown in the detailed view of FIG. 17. In contrast, in FIG. 16, the two hook-and-loop elements 90 can be seen securing a free end portion 92 to the frame 38 of the bicycle when it is wrapped by the free end portion 92 of the protection element 88.

Figure 18:
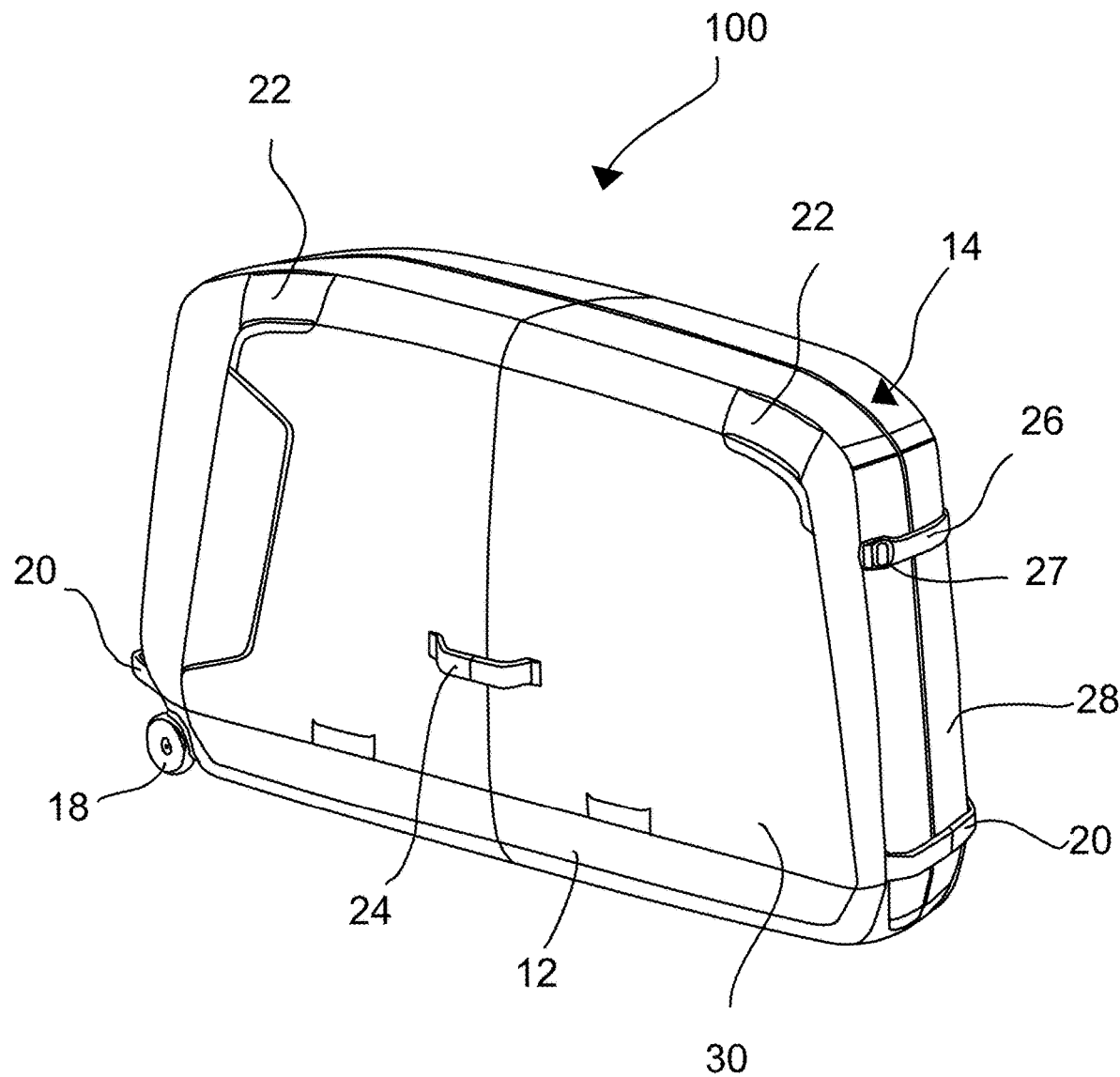
FIG. 18 shows a schematic perspective view of a second embodiment of the bicycle transport bag closed and in a transport configuration.

FIG. 18 shows a second embodiment of the bicycle transport bag 100. The second embodiment of the bicycle transport bag 100 is configured to transport a mountain bike, while the first embodiment of the bicycle transport bag 10 is configured to transport a racing bike. Thus, the two embodiments differ mainly in their dimensions, with the second embodiment being formed larger than the first embodiment. The function of the two embodiments is similar. In the following, therefore, only differences will be discussed, with parts of the same function being provided with the same reference sign.

In FIG. 20, the film hinge of the right textile element 30 can be particularly well seen, as well as the different design of the frame 138 of the bicycle configured as a mountain bike. A headset protection device 70 is omitted from the bicycle transport bag 100, as a stem 102 remains attached to a head tube of the front fork 48 during transport of the bicycle and secures the front fork 48 to the frame 138.

At least on the right textile element 30, the side portion 14 has an inner pocket 104 which can be closed by means of a zipper and can accommodate small parts in a protected manner.

Figure 21:
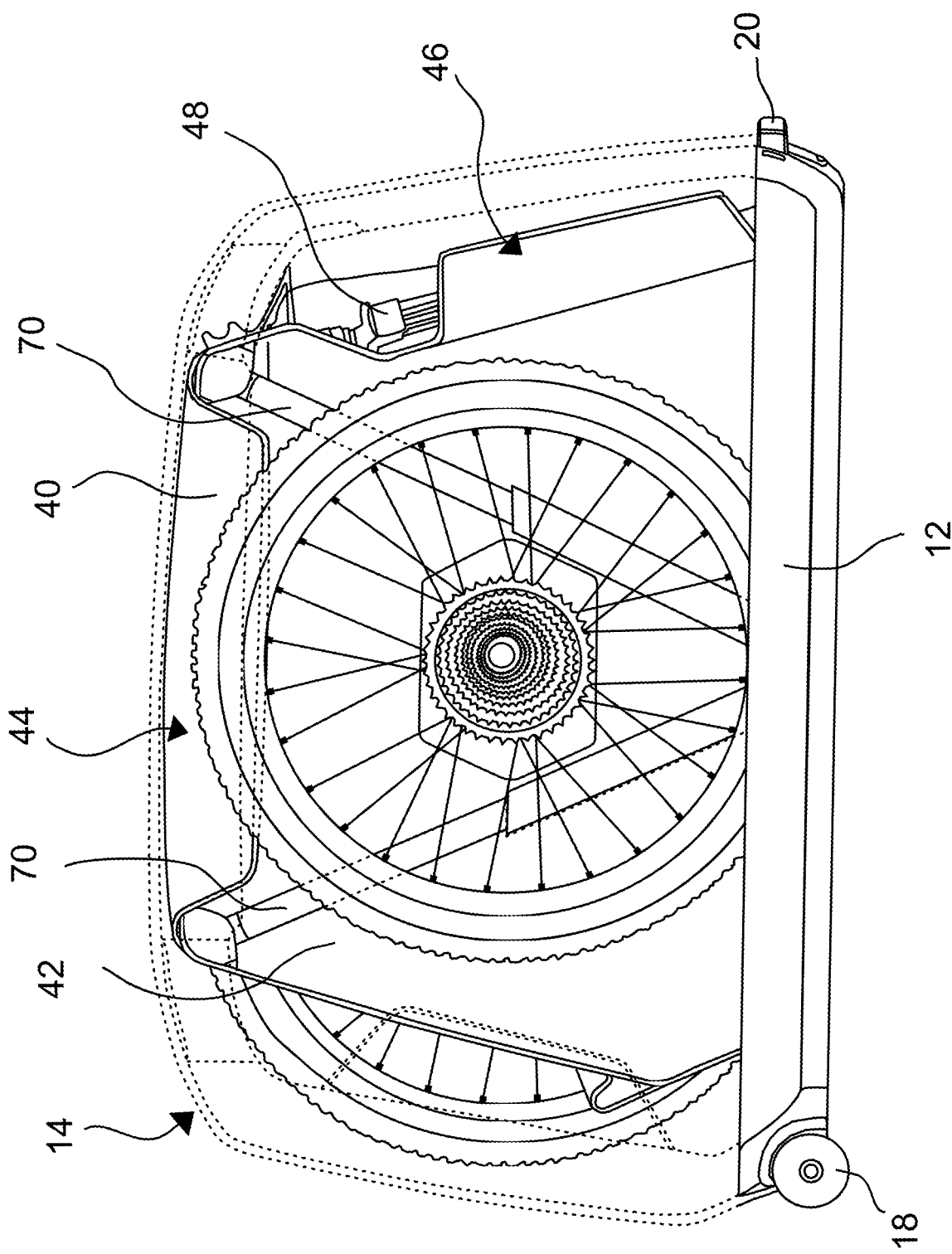
FIG. 21 illustrates in a schematic, partially transparent side view how the wrapping device of the bicycle transport bag according to FIG. 18 at least partially wraps around the bicycle.
Figure 22:
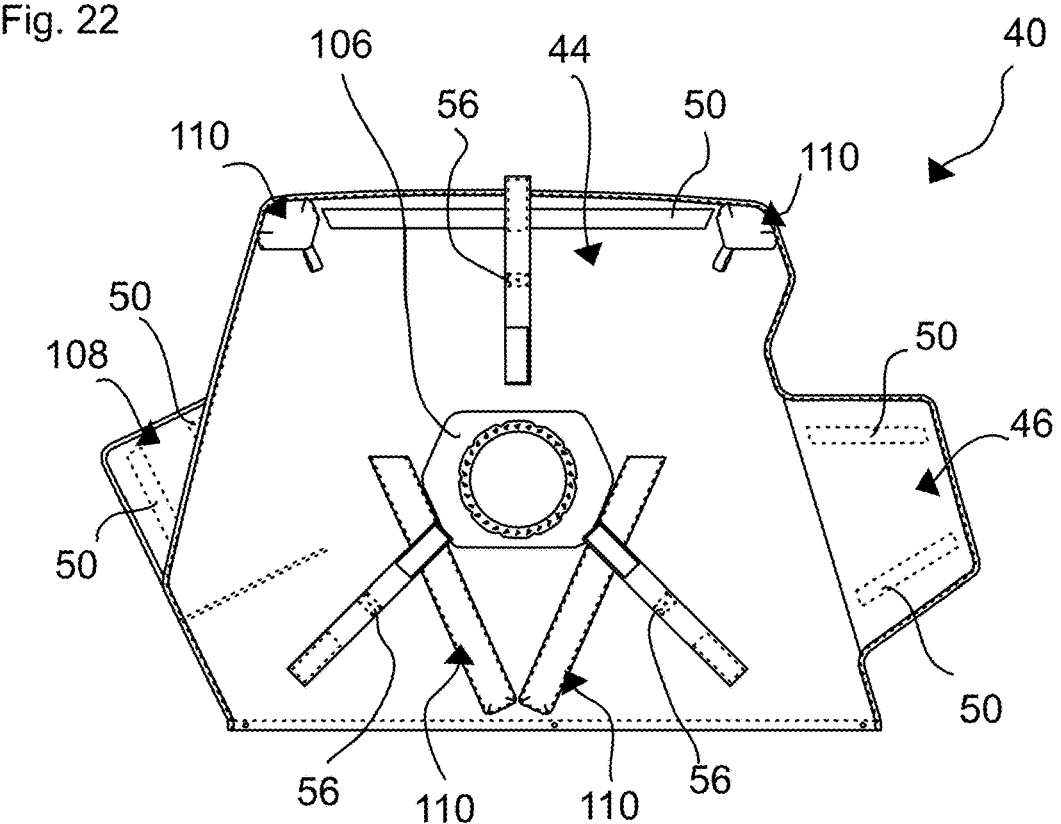
FIG. 22 shows a first wrapping element of the wrapping device of the bicycle transport bag according to FIG. 18 in a side view.
Figure 23:
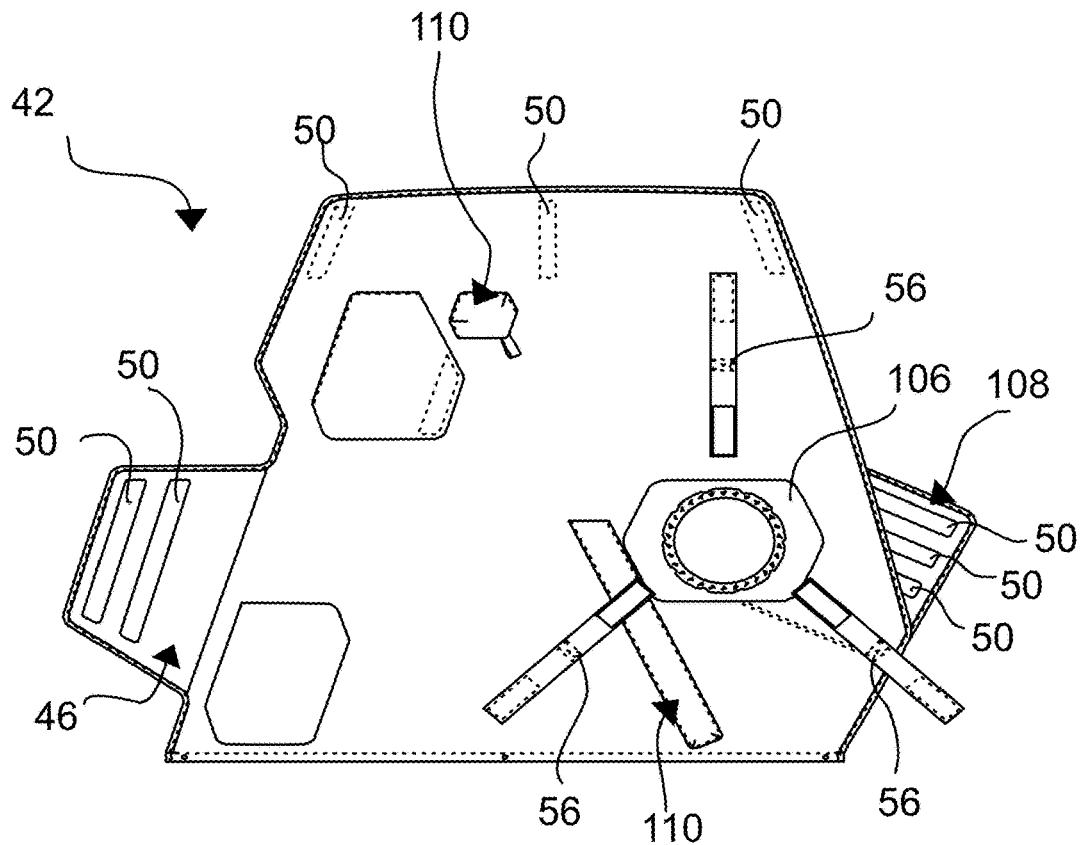
FIG. 23 shows a second wrapping element of the wrapping device of the bicycle transport bag according to FIG. 18 in a side view.

The two wrapping elements 40, 42 of the bicycle transport bag 100 have a different design from that of the bicycle transport bag 10, which can be seen in particular in its side view in FIGS. 22 and 23. The pockets 54 for holding the respective wheels are omitted. Instead, more loops 56 are provided for the wheel locking device to hold the wheels. Instead of the pockets 54, a plastic plate 106 is arranged on each of the respective wrapping elements 40, 42 to protect the large brake discs of the wheels of the mountain bike. As can be taken from a comparison of the two wrapping elements 40, 42 or FIGS. 22 and 23, the wrapping elements 40, 42 are also configured to hold the wheels offset in the longitudinal direction. Thus, a width of the bicycle transport bag 100 can remain small despite particularly wide wheels of a mountain bike. This offset can also be seen clearly in FIG. 21.

In the bicycle transport bag 100, the two wrapping elements 40, 42 are configured to be folded over each other with a rear free end region 108 over a rear structure of the frame 138 of the bicycle for protecting the frame 138 of the bicycle received in the interior space. In this regard, the attachment is analogous to other free end portions, for which a hook-and-loop fastener is also provided. Accordingly, the protective bag 86 is omitted from the bicycle transport bag 100.

The right wrapping element 42 includes two attachments 110 configured to receive two of the legs 70 of the stand 68 of the bicycle maintenance stand 66. As can be seen in FIG. 21, the legs 70 held on the right wrapping element 42 are disposed between the right wrapping element 42 and the wheel held thereon. The left wrapping element 40 includes an attachment 110 configured to receive one of the legs 70 of the stand 68 of the bicycle maintenance stand 66. The legs 70 can thus form a type of frame for the wrapping device 36, providing additional protection for the bicycle and support for the wrapping elements 40, 42.

Figure 19:
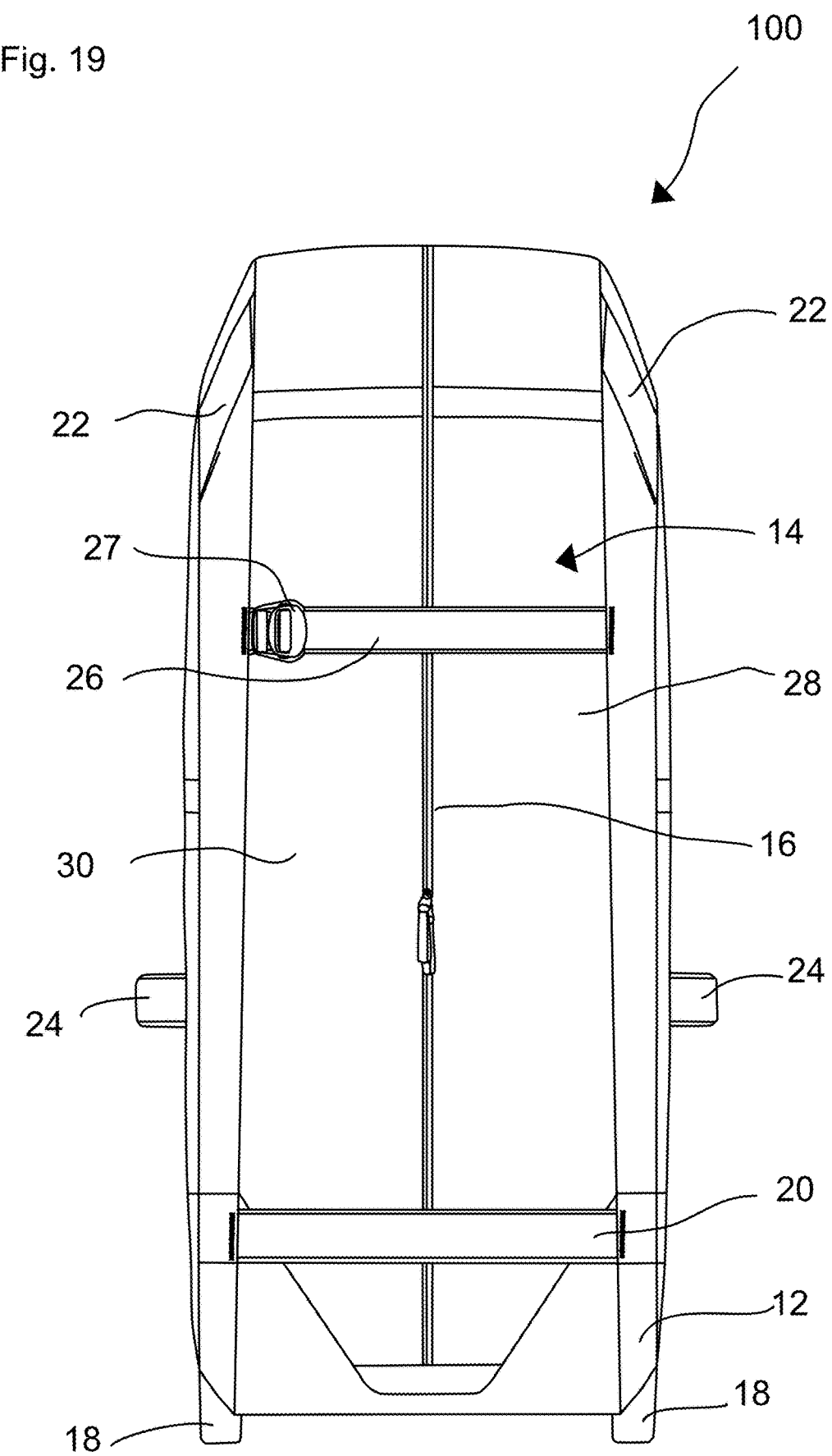
FIG. 19 shows the bicycle transport bag according to FIG. 18 in a frontal view from the front.

In FIG. 19, it can be seen that a tensioning strap 26 is arranged on the front narrow side of the bicycle transport bag 100, which can be unhooked on one side for opening the bag. For the tensioning strap 26 has a hook 27 for hooking. The tensioning strap 26 is configured to laterally compress the bicycle transport bag to adapt to a size of the bicycle. Alternatively or additionally, the tensioning strap 26 is configured to relieve tension on the zipper 16. Provided that the tensioning strap 26 is engaged, it can be used as a further handle, for example for pulling the bicycle transport bag. The zipper 16 of the bicycle transport bag 100 is not curved but runs straight.

Figure 24:
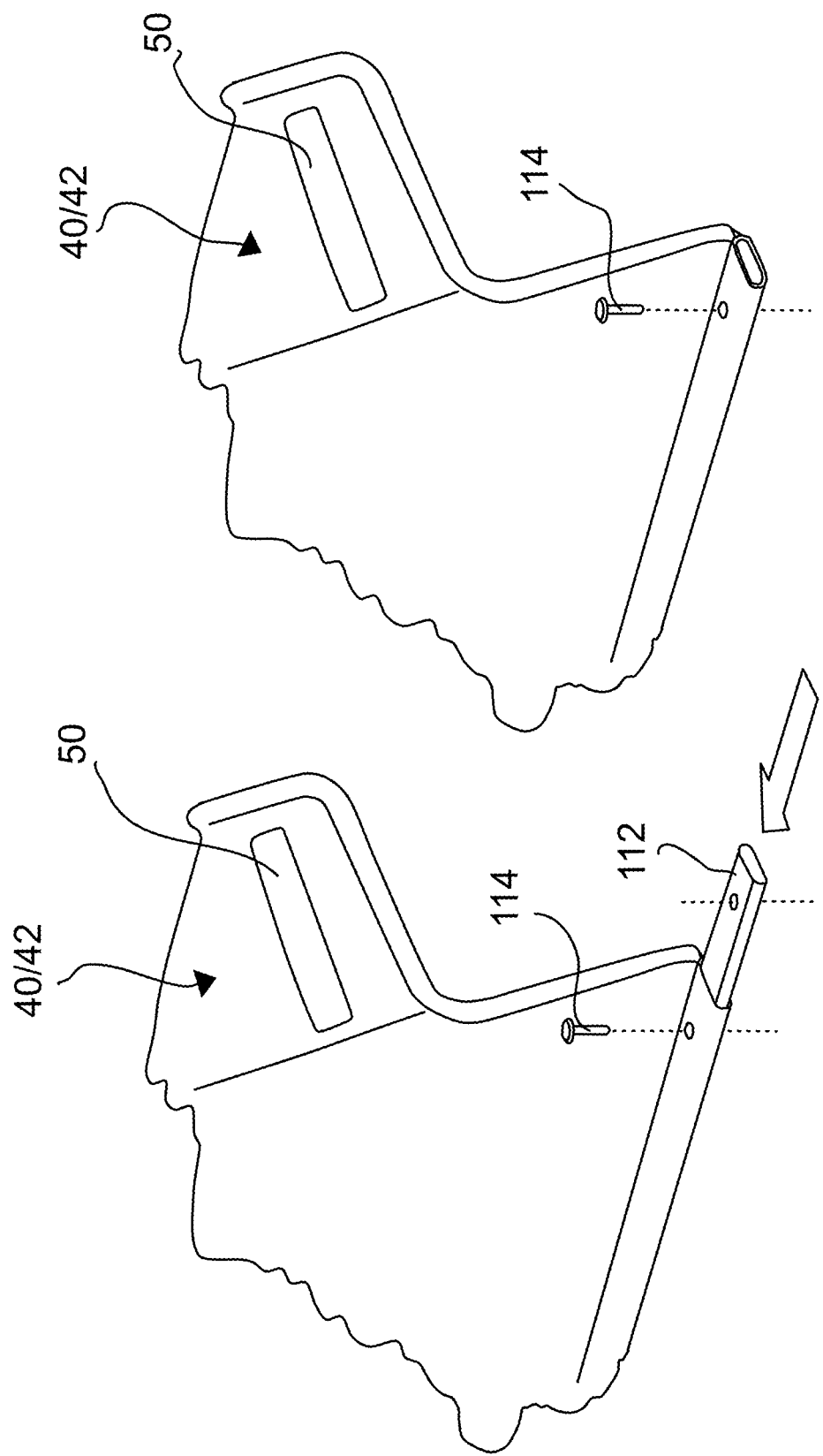
FIG. 24 illustrates in perspective view an attachment of one of the wrapping elements of FIG. 22 or 23 by means of a bar.

FIG. 24 shows an attachment of one of the wrapping elements 40, 42 of the bicycle transport bag 100 by means of a bar 112, which is configured as a fiberglass bar. The bar 112 is passed through a through hole of the wrapping element 40 or 42 and is connected to the bottom portion 12 by means of a screw or rivet 114. This makes the connection more robust than with eyelets. In particular, a load can be introduced over an entire bottom edge. Thus, a light and robust attachment of the wrapping device 36 is provided, which is useful for heavy mountain bikes.

What is claimed is:

1. A bicycle transport bag comprising:
   a cover,
      wherein the bicycle transport bag is adjustable between a transport configuration, in which a bicycle is receivable in an interior space of the bag, and a collapsed configuration,
      wherein the cover comprises a bottom portion and a side portion extending upwardly away from the bottom portion,
      wherein the side portion comprises at least a first rigid plate and a second rigid plate, which are connected to each other by a hinge, and
      wherein the side portion is foldable along the hinge for adjustment from the transport configuration to the collapsed configuration.

2. The bicycle transport bag according to claim 1, wherein at least the first or the second rigid plate is fixedly integrated in the side portion, and
   wherein the bottom portion is trough-shaped.

3. The bicycle transport bag according to claim 1, wherein the rigid plates have a vertical extension in the transport configuration of the bicycle transport bag that is less than or equal to a width of the bottom portion.

4. The bicycle transport bag according to claim 1, wherein the hinge extends in a longitudinal direction of the bicycle transport bag.

5. The bicycle transport bag according to claim 1, wherein at least one of the rigid plates is received in the bottom portion in the collapsed configuration of the bicycle transport bag.

6. The bicycle transport bag according to claim 5, wherein the rigid plates are arranged with their flat sides lying on top of each other in the collapsed configuration.

7. The bicycle transport bag according to claim 1, wherein the bicycle transport bag comprises a locking device, and
   wherein the locking device is configured to lock the side portion to the bottom portion in the collapsed configuration.

8. The bicycle transport bag according to claim 7, wherein the side portion has an outside pocket configured to receive the locking device.

9. The bicycle transport bag according to claim 1, wherein the bicycle transport bag comprises a closure device configured to be adjusted in the transport configuration of the bicycle transport bag between an open state, in which access to the interior space of the bicycle transport bag is allowed, and a closed state, in which access to the interior space is blocked.

10. The bicycle transport bag according to claim 9, wherein the closure device is configured to block, in the closed state of the closure device, an adjustment of the bicycle transport bag from the transport configuration of the bicycle transport bag to the collapsed configuration of the bicycle transport bag.

11. The bicycle transport bag according to claim 9, wherein the closure device is configured to connect two sections of the side portion with each other in the closed state of the closure device.

12. The bicycle transport bag according to claim 9, wherein the closure device comprises a zipper.

13. The bicycle transport bag according to claim 12, wherein the zipper is configured to releasably connect the side portion to the bottom portion at one end region and to releasably connect the side portion to the bottom portion at an opposite end region.

14. The bicycle transport bag according to claim 1, wherein the side portion is self-supporting in the transport configuration of the bicycle transport bag.

15. The bicycle transport bag according to claim 1, wherein the bicycle transport bag comprises at least one roller attached to an underside of the bottom portion.

16. The bicycle transport bag according to claim 1, wherein the bicycle transport bag comprises at least one handle arranged on the side portion or on the bottom portion.

17. The bicycle transport bag according to claim 1, wherein the side portion comprises an inside pocket, and
   wherein the pocket does not extend across the hinge.

18. The bicycle transport bag according to claim 1, wherein the bicycle transport bag comprises at least one protective bag which is configured to at least partially receive a bicycle chain or a derailleur of the bicycle.

19. The bicycle transport bag according claim 1, wherein the bicycle transport bag comprises a removable bicycle maintenance stand.

20. The bicycle transport bag according to claim 19, wherein the bicycle maintenance stand comprises a frame holding element.

21. The bicycle transport bag according to claim 19, wherein the bicycle maintenance stand comprises a stand which is detachably connectable to the frame holding element.

22. The bicycle transport bag according to claim 1, wherein the side portion is free of a frame construction.

23. A bicycle transport bag comprising:
   a cover,
      wherein the cover comprises a bottom portion and a side portion, and a bicycle is receivable in an interior space of the cover,
      wherein the bicycle transport bag comprises a wrapping device configured to at least partially wrap a frame of the bicycle received in the interior space to protect the frame, and
      wherein the wrapping device is fixedly connected to an inner side of the cover.

24. The bicycle transport bag according to claim 23, wherein the wrapping device comprises a first wrapping element and a second wrapping element.

25. The bicycle transport bag according to claim 24, wherein the first and second wrapping elements are configured to protect the frame of the bicycle received in the interior space by folding over each other with an upper free end portion above the frame of the bicycle.

26. The bicycle transport bag according to claim 24, wherein the first and second wrapping elements are configured to protect the bicycle received in the interior space by folding over each other with a front free end portion over a front fork.

27. The bicycle transport bag according to claim 26, wherein the first and second wrapping elements are configured to protect the frame of the bicycle received in the interior space by folding over each other with a rear free end portion over a rear structure of the frame.

28. The bicycle transport bag according to claim 23, wherein the wrapping device comprises a fastening device configured to releasably fasten the wrapping device to the frame of the bicycle or to releasably fasten first and second wrapping elements of the wrapping device to each other.

29. The bicycle transport bag according to claim 28, wherein the fastening device comprises at least one hook-and-loop fastener for connecting the first and second wrapping elements.

30. The bicycle transport bag according to claim 23, wherein the wrapping device comprises a receiving device for respective wheels of the bicycle.

31. The bicycle transport bag according to claim 30, wherein at least one of the wrapping elements comprises a pocket for holding a wheel of the bicycle.

32. The bicycle transport bag according to claim 30, wherein the receiving device of the wrapping device comprises a wheel locking device which is configured to lock a wheel held thereon.

33. The bicycle transport bag according to claim 23, wherein the wrapping device is detachable from the inside of the cover for maintenance.

34. The bicycle transport bag according to claim 23, further comprising a headset protection device, the headset protection device comprising:
　a protection element which is configured to at least partially enclose a head tube of the frame of the bicycle, a top tube of the frame of the bicycle, or a down tube of the frame of the bicycle in the bicycle transport bag, and
　a fastening device configured to retain a bicycle fork of the bicycle in the head tube.

35. The bicycle transport bag of claim 34, wherein the fastening device of the headset protection device comprises a tensioning device which is configured to tension the bicycle fork of the bicycle from below against the head tube.

36. The bicycle transport bag of claim 34, wherein the headset protection device is configured to hold a bicycle handlebar of the bicycle disassembled from the bicycle fork.

* * * * *

UNITED STATES PATENT AND TRADEMARK OFFICE
CERTIFICATE OF CORRECTION

| | | |
|---|---|---|
| PATENT NO. | : 12,145,792 B2 | Page 1 of 1 |
| APPLICATION NO. | : 17/748785 | |
| DATED | : November 19, 2024 | |
| INVENTOR(S) | : Pleasants | |

It is certified that error appears in the above-identified patent and that said Letters Patent is hereby corrected as shown below:

In the Claims

In Column 18, Claim 19, Line 39, delete "according" and insert --according to--, therefor.

Signed and Sealed this
Fourth Day of February, 2025

Coke Morgan Stewart
*Acting Director of the United States Patent and Trademark Office*